US010465665B2

United States Patent
Ma et al.

(10) Patent No.: US 10,465,665 B2
(45) Date of Patent: Nov. 5, 2019

(54) ENCLOSURE STRUCTURE PROVIDED WITH DIRECTIONALLY-LAID POWER TRANSMISSION CONDUCTORS, AND LAYING METHOD

(71) Applicant: XINJIANG GOLDWIND SCIENCE & TECHNOLOGY CO., LTD., Urumqi (CN)

(72) Inventors: Shengjun Ma, Beijing (CN); Wanshun Ma, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 15/579,542

(22) PCT Filed: Apr. 7, 2017

(86) PCT No.: PCT/CN2017/079736
§ 371 (c)(1),
(2) Date: Dec. 4, 2017

(87) PCT Pub. No.: WO2017/177862
PCT Pub. Date: Oct. 19, 2017

(65) Prior Publication Data
US 2019/0063408 A1 Feb. 28, 2019

(30) Foreign Application Priority Data
Apr. 15, 2016 (CN) .......................... 2016 1 0238242

(51) Int. Cl.
*F03D 80/80* (2016.01)
*H02G 1/06* (2006.01)
(Continued)

(52) U.S. Cl.
CPC .............. *F03D 80/85* (2016.05); *F03D 80/60* (2016.05); *H02G 1/06* (2013.01); *H02G 3/00* (2013.01);
(Continued)

(58) Field of Classification Search
CPC ........... F03D 80/60; F03D 80/85; H02G 1/06; H02G 3/00; H02G 3/03; H02G 3/32
See application file for complete search history.

(56) References Cited

U.S. PATENT DOCUMENTS 8,058,742 B2    11/2011   Erdman et al.
8,227,932 B2 *   7/2012   Murata .................. F03D 80/60
                                                      290/55
(Continued)

FOREIGN PATENT DOCUMENTS

CN      101384818 A       3/2009
CN      101939538 A       1/2011
(Continued)

OTHER PUBLICATIONS

Extended European Search Report issued in counterpart European Application No. 17781838.2, dated Jan. 18, 2019.
(Continued)

Primary Examiner — Timothy J Thompson
Assistant Examiner — Amol H Patel
(74) Attorney, Agent, or Firm — Finnegan, Henderson, Farabow, Garrett & Dunner LLP

(57) ABSTRACT

An enclosure having power transmission conductors laid in an oriented manner and a laying method. The method includes the following steps: acquiring changing situations of a surface heat transfer coefficient of an outer surface, in contact with a windward side incoming flow, of a shady side of the enclosure according to airflow parameters outside the enclosure; determining a target laying position according to
(Continued)

an inside position, corresponding to a highest surface heat transfer coefficient, of the shady side; and laying the power transmission conductor at the target laying position.

28 Claims, 21 Drawing Sheets

(51) Int. Cl.
  *H02G 3/32* (2006.01)
  *H02G 3/03* (2006.01)
  *F03D 80/60* (2016.01)
  *H02G 3/00* (2006.01)
(52) U.S. Cl.
  CPC .................. *H02G 3/03* (2013.01); *H02G 3/32* (2013.01); *F05B 2260/20* (2013.01); *Y02B 10/30* (2013.01); *Y02E 10/722* (2013.01)

(56) References Cited

U.S. PATENT DOCUMENTS

| | | | | |
|---|---|---|---|---|
| 8,319,362 B2* | 11/2012 | Vihriala | ............... | F03D 80/60 290/44 |
| 9,051,920 B2 | 6/2015 | Prebio | | |
| 2009/0045628 A1* | 2/2009 | Erdman | ............... | F03D 80/60 290/44 |
| 2010/0247326 A1 | 9/2010 | Prebio | | |
| 2018/0048135 A1* | 2/2018 | Ma | ............... | H02G 3/00 |
| 2018/0306532 A1* | 10/2018 | Ma | ............... | F03D 80/85 |

FOREIGN PATENT DOCUMENTS

| | | |
|---|---|---|
| CN | 201705585 U | 1/2011 |
| CN | 201852702 U | 6/2011 |
| CN | 204720903 U | 10/2015 |
| CN | 105089941 A | 11/2015 |
| CN | 105098670 A | 11/2015 |
| CN | 204755196 U | 11/2015 |
| CN | 105736259 A | 7/2016 |
| DE | 102013210532 A1 | 12/2014 |

OTHER PUBLICATIONS

First Office Action issued by the State Intellectual Property Office of People's Republic of China for Chinese Patent Application No. 201610238242.3, dated Feb. 23, 2018.
International Search Report issued by the State Intellectual Property Office of People's Republic of China for International Application No. PCT/CN2017/079736, dated Jul. 10, 2017.

* cited by examiner

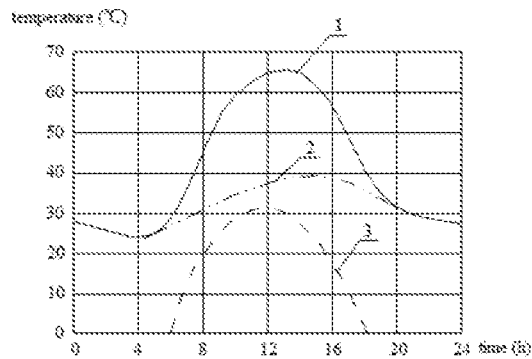 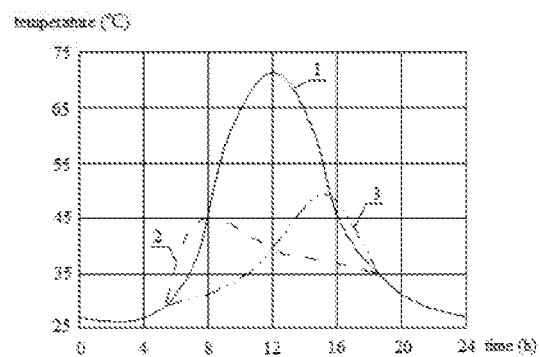

Figure 1-4  Figure 1-5

```
┌─────────────────────────────────────────┐
│ acquiring changing situations of a surface heat │
│ transfer coefficient of an outer surface, in    │──S1
│ contact with an incoming flow at an upwind      │
│ side, of a shady side of the enclosure according│
│ to airflow parameters outside the tower         │
└─────────────────────────────────────────┘
                    │
┌─────────────────────────────────────────┐
│ determining a target laying position according  │
│ to an inside position, corresponding to a highest│──S2
│ surface heat transfer coefficient, on the shady │
│ side                                            │
└─────────────────────────────────────────┘
                    │
┌─────────────────────────────────────────┐
│ laying the power transmission conductor at the  │──S3
│ target laying position                          │
└─────────────────────────────────────────┘
```

Figure 2

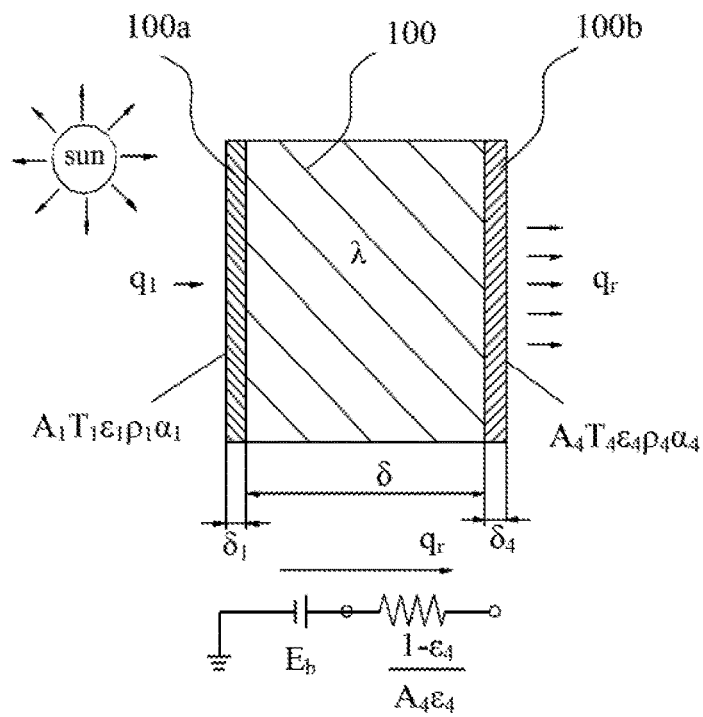
Figure 11-1
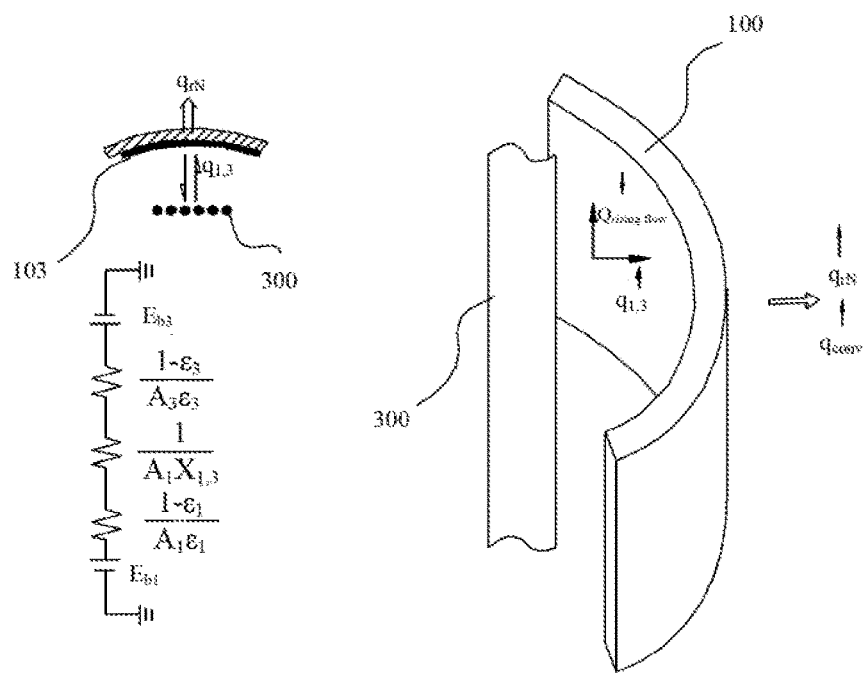
Figure 11-2
Figure 11-3

ENCLOSURE STRUCTURE PROVIDED WITH DIRECTIONALLY-LAID POWER TRANSMISSION CONDUCTORS, AND LAYING METHOD

This application is the national phase of International Application No. PCT/CN2017/078736, titled "ENCLOSURE STRUCTURE PROVIDED WITH DIRECTIONALLY-LAID POWER TRANSMISSION CONDUCTORS, AND LAYING METHOD", filed on Apr. 7, 2017, which claims the benefit of priority to Chinese Patent Application No. 201610238242.3, titled "ENCLOSURE HAVING POWER TRANSMISSION CONDUCTORS LAID IN ORIENTED MANNER AND LAYING METHOD", filed with the State Intellectual Property Office of People's Republic of China on Apr. 15, 2016, the entire disclosures of which are incorporated herein by reference.

FIELD

The present application relates to the field of heat dissipation technology, and in particular to an enclosure having power transmission conductors laid in an oriented manner and a laying method.

BACKGROUND

Reference is made to FIG. 1-1, FIG. 1-2 and FIG. 1-3, FIG. 1-1 is a schematic view showing the structure of a wind turbine tower in the conventional technology, which shows power transmission cables inside the wind turbine tower, FIG. 1-2 is a schematic view showing the laying of the power transmission cables in FIG. 1-1, and FIG. 1-3 is a schematic view showing the structure of the power transmission cables in FIG. 1-2.

As can be seen from the above figures, lots of power transmission cables 30 are laid inside the wind turbine tower, and the power transmission cables 30 extend from a switch cabinet of a generator to pass through a base platform via the bottom of a nacelle and then enter into a reference plane at the top of the tower. A nacelle 20 and the interior thereof have a yaw movement, causing that the power transmission cables 30 also have a reciprocating twisting movement. Therefore, a saddle-shaped bracket is arranged inside the tower, and the parts, below the saddle-shaped bracket, of the cables are hanging down near the tower wall 10 in groups and are fixed, and are in a substantially vertical state as a whole.

Reference is made to FIG. 1-4 and FIG. 1-5, FIG. 1-4 is a schematic diagram of the composition of a resulting temperature outside a tower in summer in the conventional technology, and FIG. 1-5 shows resulting temperatures of the tower in the conventional technology in different orientations. FIG. 1-4 and FIG. 1-5 are each obtained by taking a practical tower within the territory of China in Northern Hemisphere as a monitoring object.

In FIG. 1-4, the resulting temperature of the tower is formed by a combined effect of solar radiation and ambient air temperature, that is, a curve 1 (indicating the resulting temperature outside the tower) is formed by superposing a curve 2 (indicating the temperature of air outside the tower) on a curve 3 (indicating an equivalent temperature of solar radiation).

In FIG. 1-5, a curve 1 indicates a resulting temperature of a horizontal direction of the tower (i.e., the temperature of the top of the tower), a curve 2 indicates a resulting temperature of an east vertical side of the tower, and a curve 3 indicates a resulting temperature of a west vertical side of the tower.

The above figures reflect:

1. The resulting temperature of the top of the nacelle is constantly higher than the resulting temperatures of the east vertical side and the west vertical side of each of the enclosures such as the tower and the nacelle 2 from 8 o'clock to 14 o'clock, and by taking 12 o'clock as a symmetry point, an exterior environment of the top of the nacelle 20 is continuously in an environment with a high resulting temperature.

2. For each of the enclosures such as the tower and the nacelle 20, the temperature at the west vertical side is higher than the temperature at the east vertical side after 8 hours.

3. After the west vertical side reaches the maximum temperature value at 16 o'clock, the temperature wave will be transferred to inner surfaces of the tower and the nacelle 20 after a delay of about half an hour; and the duration of the delay is related to a heat storage coefficient of a coating material of the tower and the nacelle and materials of the tower and the nacelle, and the magnitude of the heat storage coefficient corresponds to the duration of the delay of high temperature being transferred into the enclosure. In summer of Hami area at the southern slope of the Tianshan mountains in Sinkiang, the geographical position of Hami area determines that wind frequently blows after 18 o'clock, such that the wind power generator set keeps generating electricity at full power till dawn of the next morning. This means that the heat generated by the heat sources inside the wind power generator set continues to increase, and the falling of the external environment temperature does not immediately influence the internal environment temperature of the generator set.

In other words, the inside of the tower is always in a high temperature state, especially in summer, and in this case, the excessively high internal temperature causes the power transmission cables 30 to be difficult to dissipate heat, and the temperature of the power transmission cables 30 may even become higher, which adversely affects the service life of the power transmission cables and the safety of the entire power transmission system.

SUMMARY

In order to address the above-described technical issues, an enclosure having power transmission conductors laid in an oriented manner and a laying method are provided according to the present application. With the oriented laying method, the power transmission conductors in the enclosure are enabled to dissipate heat more efficiently, the loads of the power transmission conductors can be improved, and the service life of the power transmission conductors can be extended, and thus the safety of the entire power transmission system can be improved.

In a method for laying a power transmission conductor according to the present application, the power transmission conductor is laid inside an enclosure. The method includes steps of:

acquiring changing situations of a surface heat transfer coefficient of an outer surface, in contact with a windward side incoming flow, of a shady side of the enclosure according to airflow parameters outside the enclosure;

determining a target laying position according to an inside position, corresponding to a highest surface heat transfer coefficient, of the shady side; and laying the power transmission conductor at the target laying position.

Optionally, the step of acquiring changing situations of the surface heat transfer coefficient includes: acquiring corresponding Reynolds numbers according to airflow parameters outside the enclosure, and establishing changing situations of the surface heat transfer coefficient of the outer surface at the shady side at different Reynolds numbers; and the step of determining the target laying position includes: determining the target laying position according to inside positions, corresponding to the highest surface heat transfer coefficient at different Reynolds numbers, at the shady side.

Optionally, the method includes recording positions, corresponding to the highest surface heat transfer coefficient at different Reynolds numbers, at the shady side as target laying angles, wherein, the target laying angle is defined as an included angle formed between a normal vector of a contact surface, where the windward side incoming flow comes into contact with an outer wall of the enclosure, and the position corresponding to the highest surface heat transfer coefficient on the enclosure; and the target laying position is between a minimum target laying angle and a maximum target laying angle at different Reynolds numbers.

Optionally, the changing situations of the surface heat transfer coefficient of the outer surface, in contact with the windward side incoming flow, of the shady side of the enclosure is reflected by a Nusselt number.

Optionally, the shady side is defined as a range from 45 degrees clockwise from a due north direction to 45 degrees counterclockwise from the due north direction.

Optionally, the step of acquiring changing situations of the surface heat transfer coefficient includes: according to a Reynolds number corresponding to a height position of the enclosure, acquiring changing situations of the surface heat transfer coefficient of a circumferential position of the outer surface at the shady side corresponding to the height position; and the inside position is an inside position corresponding to the highest surface heat transfer coefficient of the circumferential position; and the step of determining the target laying position includes: taking a vertically extending line corresponding to the inside position as a reference laying line for laying the power transmission conductor; and rotating the reference laying line clockwise or counterclockwise by a predetermined angle according to changes of the Reynolds numbers at different heights of the enclosure, and determining a position of the rotated reference laying line as the target laying position.

Optionally, the step of acquiring changing situations of the surface heat transfer coefficient includes: selecting one height position at an upper segment of the enclosure and one height position at a lower segment of the enclosure, and according to Reynolds numbers at the two height positions, acquiring changing situations of the surface heat transfer coefficient of circumferential positions of the outer surface at the shady side corresponding to the two height positions;

the inside position includes inside positions corresponding to the highest surface heat transfer coefficients of the circumferential positions corresponding to the two height positions; and the step of determining the target laying position includes: taking a connection line connecting the two inside positions corresponding to the highest surface heat transfer coefficients of the two circumferential positions as the target laying position.

Optionally, the step of acquiring changing situations of the surface heat transfer coefficient includes: selecting one height position at an upper segment of the enclosure and one height position at a lower segment of the enclosure, and according to Reynolds numbers at the two height positions, acquiring changing situations of the surface heat transfer coefficient of circumferential positions of the outer surface at the shady side corresponding to the two height positions;

the inside position includes inside positions corresponding to the highest surface heat transfer coefficients of the circumferential positions corresponding to the two height positions; and the step of determining the target laying position includes: taking a connection line connecting the two inside positions corresponding to the highest surface heat transfer coefficients of the two circumferential positions as a reference laying line; and rotating the reference laying line by a predetermined angle according to changes of the highest surface heat transfer coefficients of the two circumferential positions, and determining a position of the rotated reference laying line as the target laying position.

Optionally, the windward side incoming flow is an incoming flow in a main wind direction obtained according to a weather wind rose of a location where the enclosure is located.

Optionally, the weather wind rose is selected as a weather wind rose of a high temperature season of the location where the enclosure is located.

Optionally, the power transmission conductor is bent to allow the power transmission conductor to be bent back and forth when being projected onto an inner surface of the enclosure.

Optionally, the electric power transmission conductor is further bent to allow a vertical distance from the power transmission conductor to the inner surface of the enclosure to change alternately.

An enclosure having a power transmission conductor laid in an oriented manner is further provided according to the present application, the power transmission conductor is arranged inside the enclosure, and the power transmission conductor is laid inside the enclosure with the method according to any one of the above aspects.

Optionally, an included angle between the target laying position of the power transmission conductor and the windward side incoming flow ranges from 110 degrees to 125 degrees.

Optionally, the windward side incoming flow comes from a southwest direction or a southeast direction.

Optionally, the power transmission conductor is laid in a back and forth bending manner when being projected on an inner surface of the enclosure.

Optionally, a vertical distance from the power transmission conductor to the inner surface of the enclosure changes alternately.

Optionally, the structure of a unit formed by laying the conductor in the back and forth bending manner is polyline shaped, or trapezoidal, or S-shaped; and the polyline shape is bent directly or has an arc shape at a bent position.

Optionally in a circumferential direction of the inner surface of the enclosure, the power transmission conductor as a whole has a radian adapted to the arc-shaped inner surface of the enclosure.

Optionally, an extending direction of the power transmission conductor from top to bottom is arranged to be inclined with respect to a vertical direction, and is adapted to an inclination angle of the inner surface of the enclosure.

Optionally, a sunny side of the enclosure is provided with a thermal insulation layer, and/or a shady side of the enclosure is provided with a thermal conduction layer.

Optionally, the thermal insulation layer includes an inner surface thermal insulation layer and an outer surface thermal insulation layer of the sunny side, the outer surface thermal insulation layer is configured to have at least one of characteristics of a low infrared absorptivity, a high reflectivity, and a high infrared emissivity; and the inner surface thermal insulation layer is configured to have at least one of characteristics of a low infrared emissivity, a low infrared absorptivity and a low thermal conduction coefficient.

Optionally, the thermal conduction layer includes an inner surface thermal conduction layer and an outer surface thermal conduction layer of the shady side, the outer surface thermal conduction layer is configured to have at least one of characteristics of a high reflectivity and a low infrared absorptivity; and the inner surface thermal conduction layer is configured to have at least one of characteristics of a low reflectivity; a high infrared absorptivity and a high infrared emissivity.

Optionally, the thermal insulation layer is arranged in a high temperature region at the sunny side, and the high temperature region is determined according to thermal radiation data monitored practically.

Optionally, the high temperature region is determined according to thermal radiation data monitored in summer and is defined as a range from 90 degrees to 100 degrees westward from the due south.

Optionally, an outer surface of the power transmission conductor is coated with a coating having a high infrared emissivity.

Optionally, the enclosure is a wind turbine tower.

An enclosure having a power transmission conductor laid in an oriented manner is further provided according to the present application, and the power transmission conductor is arranged inside the enclosure; and the power transmission conductor is laid at a shady side of the enclosure; and a target laying position of the power transmission conductor at the shady side is determined by an inside position, corresponding to a highest surface heat transfer coefficient, at the shady side; and the surface heat transfer coefficient is a surface heat transfer coefficient of an outer surface, in contact with a windward side incoming flow, of the shady side.

Optionally, the target laying position is inclined with respect to a vertically extending line on the inner side of the shady side, and an angle of inclination is determined by changing situations of Reynolds numbers corresponding to the windward side incoming flow at different heights of the shady side.

Optionally, an included angle between the target laying position of the power transmission conductor and the windward side incoming flow ranges from 110 degrees to 125 degrees.

Optionally, the windward side incoming flow comes from southwest or southeast.

Optionally, the windward side incoming flow is an incoming flow in a main wind direction obtained according to a weather wind rose of a location where the enclosure is located.

Optionally, the weather wind rose is selected as a weather wind rose of a high temperature season of a location where the enclosure is located.

In the present application, the conductors of the enclosure are arranged at a shady side, which just makes full use of the "cold source" at the shady side to exchange heat with the "heat source" inside the tower, to lower the internal temperature, prevent overheating, improves the rate of heat transfer of the enclosure with the shady side and the natural environment, thereby improving the loads of the power transmission conductors, extending the service life of the conductors and even other internal components, and improving the safety of the power transmission system.

Further, in the solution of the present application, not only the conductors are laid at the shady side of the tower wall, to utilize the cold source at the low temperature side to dissipate heat, more importantly, the specific position at the shady side for laying the conductors is accurately determined. That is, in the present application, the power transmission conductor is targetedly arranged at a certain specified position of the shady side (which is actually the position of the turbulent flow detachment and the position corresponding to the highest surface heat transmission coefficient), thereby more efficiently using the "cold source", and further realizing the effect of reducing the internal temperature.

BRIEF DESCRIPTION OF THE DRAWINGS

FIG. 1-2 is a schematic view showing the laying of power transmission cables in FIG. 1-1;

FIG. 1-3 is a schematic view showing the structure of the power transmission cables in FIG. 1-2;

FIG. 1-4 is a schematic diagram of the composition of a resulting temperature outside a tower in summer in the conventional technology;

FIG. 1-5 shows resulting temperatures of the tower in the conventional technology in different orientations;

FIG. 2 is a flow chart of an embodiment of a laying method for laying power transmission conductors 300 according to the present application;

FIG. 3 is a schematic view showing solar radiation in various orientations of a wind turbine tower in summer and a range, within which high temperature and storm may occur, of the wind turbine tower in summer;

FIG. 4-1 is a schematic diagram of a boundary layer formed when a windward side incoming flow externally sweeps over the tower;

FIG. 4-2 is a schematic view showing turbulent flow detachment in FIG. 4-1;

FIG. 5 is a curve diagram showing changes of Nusselt numbers Nu of a local surface of the tower as the angle varies at three different Reynolds anthers Re when an air flow externally sweeps over the tower;

FIG. 6-1 is a wind rose at an height of 10 meters of a wind farm in summer (from June to August);

FIG. 6-2 is a wind rose at an height of 70 meters of the wind farm in FIG. 6-1 in summer (from June to August);

FIG. 6-3 is a schematic view of a first embodiment for laying power transmission conductors 300 in accordance with the wind rose in FIG. 6-1;

FIG. 7-1 is a wind rose at an height of 10 meters of a wind farm in summer (from June to August);

FIG. 7-2 is a wind rose at an height of 70 meters of the wind Farm in FIG. 7-1 in summer (from June to August);

FIG. 7-3 is a schematic view of a second embodiment for laying power transmission conductors 300 in accordance with the wind rose in FIG. 7-1;

FIG. 8-1 is a first schematic view showing assisting in laying and orientating the conductors 300 according to the wind roses;

FIG. 8-2 is a second schematic view showing assisting in laying and orientating the conductors 300 according to the wind roses;

FIG. 8-3 is a third schematic view showing assisting in laying and orientating the conductors according to the wind roses;

FIG. 8-4 is a fourth schematic view showing assisting in laying and orientating the conductors according to the wind roses;

FIG. 9-1 is a schematic view showing a first structure of the power transmission conductors 300 being laid inside the wind turbine tower according to the present application;

FIG. 9-2 is a diagram showing the principle of heat transfer between a tower side wall and a power transmission conductor 300 in FIG. 9-1;

FIG. 9-3 is a schematic view showing a second structure of a power transmission conductor 300 being laid inside the wind turbine tower according to the present application;

FIG. 9-4 is a schematic view showing a third structure of a power transmission conductors 300 being laid inside the wind turbine tower according to the present application;

FIG. 10-1 is a schematic view showing the structure of an embodiment of a wind turbine tower according to the present application;

FIG. 10-2 is a diagram showing beat transfer analysis of natural convection of a conductor 300 in FIG. 10-1;

FIG. 10-3 is a diagram showing the position relationship among the tower wall 100, the conductor 300 and the air boundary layer of the conductor 300 in FIG. 10-1;

FIG. 10-4 is a diagram showing growth analysis of a boundary layer of the conductor 300 in FIG. 10-2;

FIG. 10-5 is a diagram showing growth analysis of the boundary layer of the conductor 300 in FIG. 10-1 in another view angle;

FIG. 10-6 is a schematic view in which the growths of the boundary layer in FIG. 10-4 and FIG. 10-5 are superposed;

FIG. 11-1 is a partial sectional view of a side wall, at a sunny side, of the wind turbine tower according to the present application;

FIG. 11-2 is a schematic view of radiant heat exchange between the conductor 300 inside the wind turbine tower and the side wall at the shady side of the wind turbine tower according to the present application;

FIG. 11-3 is a schematic perspective view showing the transfer of heat flow in FIG. 11-2.

REFERENCE NUMERALS IN FIG. 1-1 TO FIG. 1-5

Figure 1:
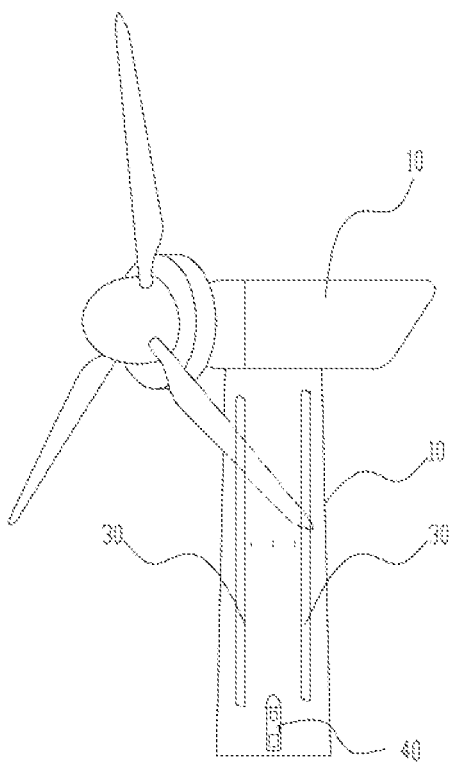
FIG. 1-1 is a schematic view showing the structure of a wind turbine tower in the conventional technology.

10 tower wall, 20 nacelle,
30 power transmission cable, 40 tower door;

REFERENCE NUMERALS IN FIG. 2 TO FIG. 12

100 tower wall, 101 thermal insulation board,
102 aluminum foil, 100a outer surface thermal insulation layer,
100b inner surface thermal insulation layer, 103 inner surface thermal conduction layer;
200 clamping plate;
300 conductor, 300' reference laying line,
301 straight line segment, 302 arc line segment,
300a crescent-shaped boundary layer, 300a' boundary layer overlap region;
400 nacelle.

DETAILED DESCRIPTION OF EMBODIMENTS

For enabling the person skilled in the art to better understand the technical solution of the present application, the present application is described further in detail hereinafter with reference to the drawings and specific embodiments. In the following embodiments, the description is made by embodying an enclosure as the tower, and it is apparent that this solution is applicable for other similar enclosures as long as it has a power transmission conductor 300 (a busbar or a power conductor) inside and has a demand for preventing overheating (for example, a television tower), and the principle is the same, which will not be repeated here.

In addition, for ease of understanding and concise description, the description is made integrally by combining the enclosure and the laying method of power transmission conductors 300 (which are different from communication conductors inside a generator set and are abbreviated as the conductors hereinafter) inside the enclosure, and the beneficial effects are not described repeatedly here. Similar to the conductors in the background, in the wind turbine tower, the portions, below the saddle-shaped bracket, of the conductors are laid in the following manner, and the portions, above the saddle-shaped brackets, of the conductors will be twisted and are not objects of the laying method in this solution.

Figures 1, 2, 3:
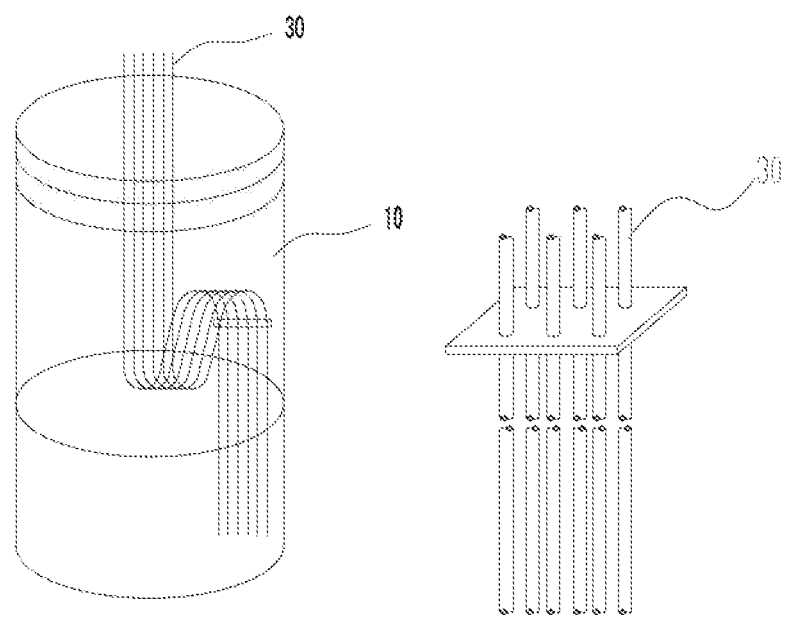
Figure 3:
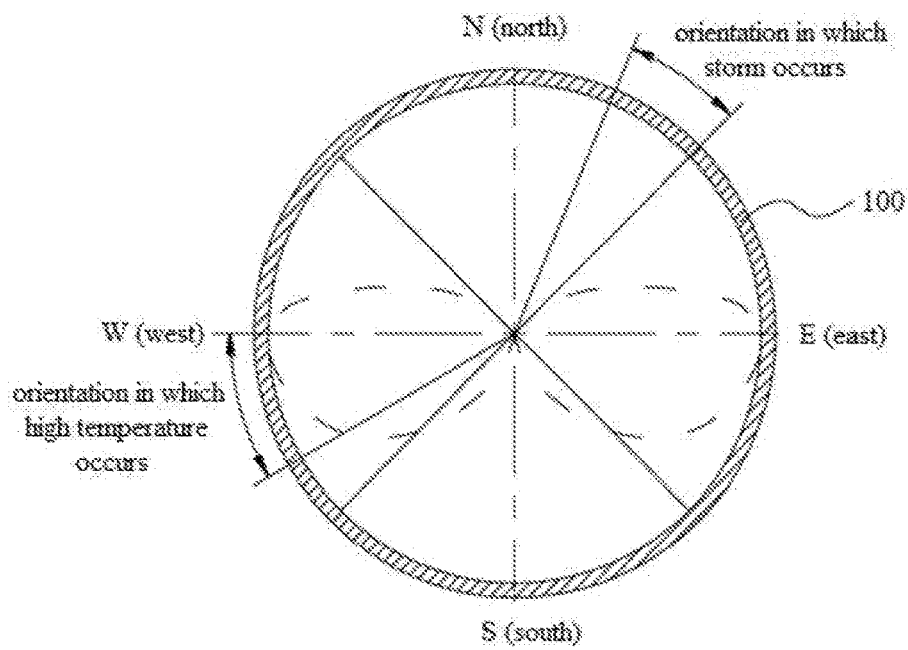

Reference is made to FIG. 2 which is a flow chart of an embodiment of a laying method for laying power transmission conductors according to the present application. The laying method includes steps S1, S2 and S3.

In the step S1, changing situations of a surface heat transfer coefficient (i.e., a heat transfer coefficient of a fluid-structure interaction surface) of a surface, in contact with a windward side incoming flow, of a shady side of a tower wall 100 are acquired according to airflow parameters outside the tower.

In step S2, a target laying position is determined according to an inside position, corresponding to a highest surface heat transfer coefficient, of the shady side.

Here, "according to an inside position" means that the conductors 300 are laid at an inner side of the tower wall 100, and therefore, the specific laying position of the conductors 300 can be determined by taking the position on the inner surface as a reference, rather than limiting that the conductors 300 are attached to the inner surface. As can be seen from the embodiments described later, the conductor 300 may be spaced apart from the inner surface of the tower wall 100 at a preset distance.

In step S3, the power transmission conductors 300 are laid at the target laying position.

First, reference is made to FIG. 3, which is a schematic view showing solar radiation in various orientations of a wind turbine tower in summer and a range, within which high temperature and storm may occur, of the wind turbine tower in summer.

This figure depicts the diurnal change of daily radiation of an outer circumference of the tower in summer which are measured and drawn based on weather data of a natural environment where a real wind turbine tower is located. The change in the amount of daily radiation is shown by the dashed lines in FIG. 3, and the radial amplitudes (length) of the dashed lines in various orientations represent the radiant intensities of radiation projected by the sun on the tower wall 100 instantly in corresponding tower directions and corresponding time frames.

As illustrated, a position at about 60 degrees in a clockwise direction from south to west is an orientation where a high temperature begins to occur, and the high temperature continues till reaching the due west side, and beyond the due west side, the radiation intensity begins to reduce (i.e., the "western exposure" as we called generally). The due north side at this geographical location will not directly exposed to solar radiation, and are only exposed to the local earth surface's radiation and atmospheric radiation, that is, the environmental radiation, and the amplitude of the radiation is very weak. The due north side in the figure is also the shady side mentioned in the present application. FIG. 3 is only one embodiment, and the shady side of the tower generally refers to a region range of the tower barely exposed to solar radiation. In practice, the region receiving direct sunlight is mainly a region between the Tropic of Cancer and the Tropic of Capricorn, that is, between the south latitude of 23.5 degrees to the north latitude of 23.5 degrees. At a place outside this region, the sunlight mainly irradiates obliquely. China is in the Northern Hemisphere, the sunlight irradiates from the south, so the shady side in FIG. 3 is the north side. For the wind turbine tower in a country in the Southern Hemisphere, the sunlight irradiates from the north, and the shady side in this case is naturally the south side of the tower. The drawings of the embodiments herein are generally described by taking the shady side being the north side as an example, and it is obvious that the scope of protection of the present application is not limited to this.

Moreover, according to the storm information reflected from the figure, an outer surface at the shady side may still be flushed by storm in fact, and the extremely weak solar radiation together with the directional storm (with regularity) causes the shady side, at the due north side, of the tower wall 100 and an outer side of a region at the right side of the shady side to have a low temperature.

According to the rule of material migration, flux (heat flow impetus) (temperature pressure)/resistance (thermal resistance) in the material migration process. The conductors 300 are arranged inside the tower, and especially a generator set convertor and its electric reactor, and transformers (including the transformer for supplying service power to the generator set and the transformer connected to a power grid and configured to output electric energy) are arranged at the bottom of the tower, and all of these components are heat sources, and thus the outer surface temperatures of the heat sources will be much higher than the temperature of the shady side of the tower wall 100.

The shady side (with a temperature generally lower than the temperature of the sunny side by 5 Celsius degrees to 10 Celsius degrees) and the air with a low temperature near the outer surface of the tower wall 100 are all large "containable" "cold sources". The "containable" here refers to the capability to accommodate and carry heat. The "cold source" and "heat source" are the terminologies in the field of thermology of physics, the conductors 300 and electrical equipment are "heat sources", and the "heat sources" can spontaneously transfer heat to the "cold sources".

Arranging the conductors 300 at the shady side is just to make full use of the "cold source" of the shady side, to exchange heat with the "heat sources" inside the tower, to reduce the internal temperature of the tower, prevent overheating, extend the service life of the internal components of the tower such as the conductors 300, and improve the security of the power transmission system.

Figures 1, 4:
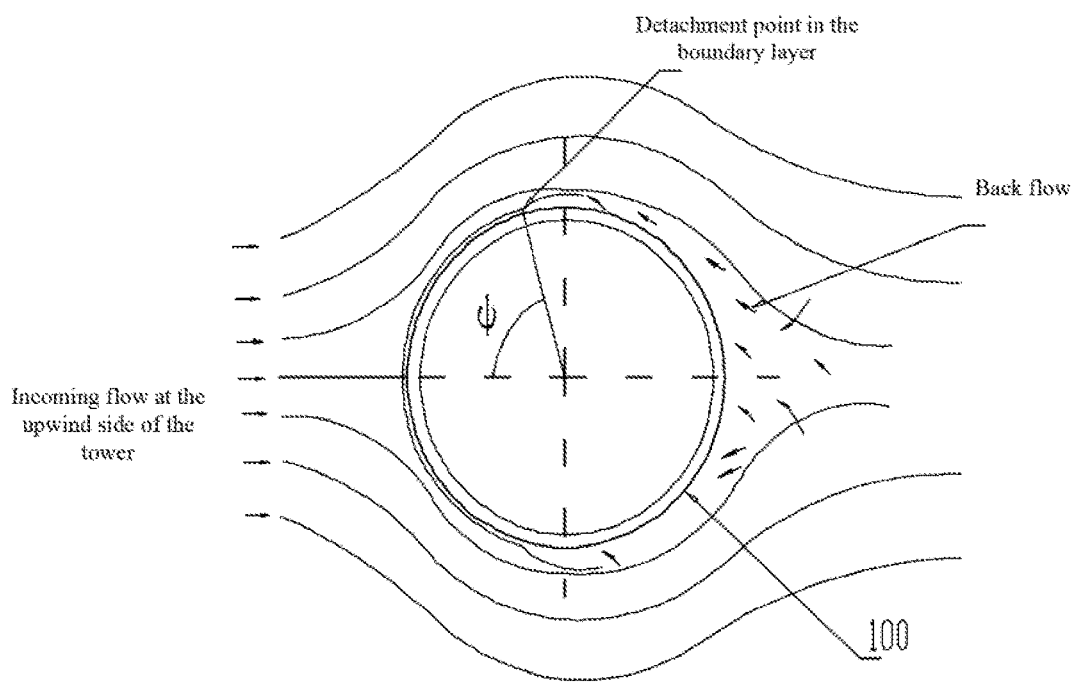
Figures 2, 4:
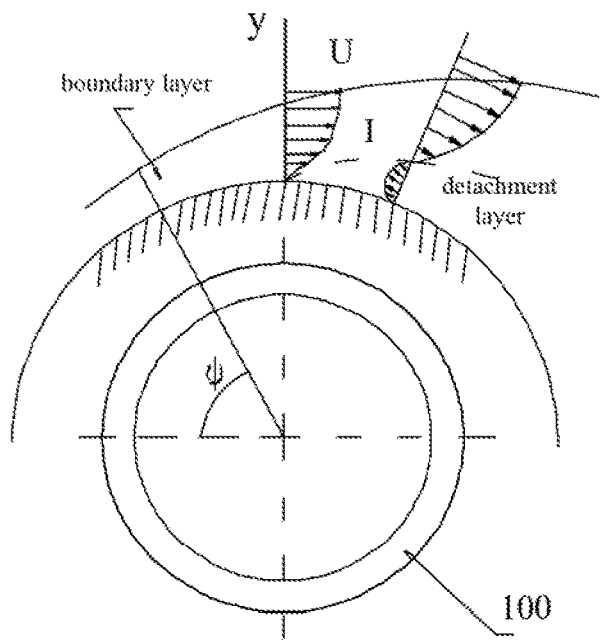

On the basis of laying the conductors 300 at the shady side, reference is further made to FIG. 4-1 and FIG. 4-2. FIG. 4-1 is a schematic diagram of a boundary layer formed when a windward side incoming flow externally sweeps over the tower and FIG. 4-2 is a schematic view showing turbulent flow detachment in FIG. 4-1.

As shown in FIG. 4-1, when the windward side incoming flow flows over the tower wall 100, the pressure, the flow rate, and the flow direction of the air flow in the boundary layer will change greatly along the curved surface of the tower wall 100, thus affecting heat exchange. Due to the change of the flow interface, the pressure of the air flow approximately descends progressively at a front half of the tower cylinder wall, that is $$\left(\frac{dp}{dx}\right)_x < 0,$$

then tends to rise again, i.e., $$\left(\frac{dp}{dx}\right)_x > 0.$$

It is to be noted particularly that as the air flow in the boundary layer of the wall surface of the tower wall 100 continues to move forward, the kinetic energy of the air flow will gradually reduce, and the velocity of the air flow in the boundary layer is lower than the velocity of the air flow outside the boundary layer, and the corresponding kinetic energy of the air flow in the boundary layer is also small. Due to the consumption of the kinetic energy, the velocity gradient of the air flow on the curved wall surface of the tower will approximate to zero at a certain position on the wall surface, that is, $$\left(\frac{\partial u}{\partial y}\right)_w = 0,$$

As shown in FIG. 4-2, at a starting point of the dotted line I, the air flow passing over the wall surface of the tower wall 100 stops flowing forward, and then flows in the opposite direction since $$\left(\frac{dp}{dx}\right)_x > 0,$$

in the rightward direction along the curved surface (x direction), thereby forming the back flow as shown in FIG. 4-1. The starting point of the dotted line I of FIG. 4-2 on the wall surface is referred to as a starting point of the turbulent flow detachment (or referred to as a separation point, as the boundary layer separation point shown in FIG. 4-1), and from this point, reverse flowing occurs in the boundary layer to form whirlpool which destroys the normal flow of the boundary layer. That is, the position corresponding to the greatest heat exchange efficiency is not actually the position on the tower wall 100 where the windward side incoming flow directly faces towards, but is positions on two sides of the tower wall 100, and accordingly, those positions should be the positions where the heat exchange efficiency is the greatest.

In this embodiment, the change of a surface heat transfer coefficient at a corresponding position of the tower wall 100 can be obtained through the air flow parameters outside the tower, to reflect the positions corresponding to low and high heat exchange efficiencies. In practical, it may be understood that the obtained position corresponding to the greatest surface heat transfer coefficient is just the position where the turbulent flow detachment occurs.

The surface heat transfer coefficient can be reflected indirectly by the Nusselt number Nu $$\left(N_u = \frac{hL}{k},\right.$$

L indicates a geometric feature length of the heat transfer surface, which is reflected as the diameter of die tower, h indicates a surface heat transfer coefficient of the tower wall surface in contact with the air flow, k indicates the thermal conductivity coefficient of the static fluid), and the Nusselt number Nu is a dimensionless number that can indirectly reflect the magnitude of the surface heat transfer coefficient of the tower. The surface heat transfer coefficient is determined by multiple parameters. According to the principle of heat transfer, the Nusselt number Nu can simplify the acquiring of the surface heat transfer coefficient.

In this embodiment, when acquiring the Nusselt number Nu, first corresponding Reynolds numbers Re can be obtained according to the air flow parameters outside the tower $$\left(Re = \frac{\rho u d}{\mu},\right.$$

ρ indicates an air flow density, μ it indicates an air flow viscosity coefficient, d indicates the diameter of the tower wall 100, u indicates an air flow rate), and then changing situations of the surface heat transfer coefficient of the surface, which is in contact with the air flow to form the convection, of the tower wall 100 at different Reynolds numbers Re are established.

Figure 5:
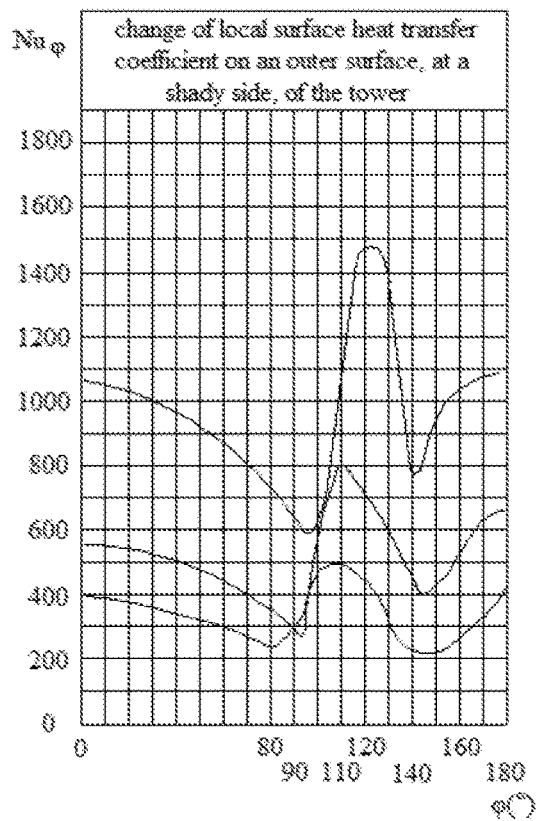

Reference is further made to FIG. 5, FIG. 5 is a curve diagram showing changes of Nusselt numbers Nu of a local surface of the tower as the angle varies at three different Reynolds numbers Re when the air flow externally sweeps over the tower. The local surface here covers specifically a range of the tower wall 100 from the position of a normal vector of a contact surface, where the windward side incoming flow comes into contact with the tower wall 100, to the position of 180 degrees northward.

In this figure, three continuous curves are shown and are corresponding, to three Reynolds numbers Re respectively. The corresponding Reynolds numbers Re increase gradually from bottom to top, and the vertical axis represents the Nusselt number Nu and the horizontal axis represents the angle. It can be seen from the figure that, three peaks of the Nusselt number Nu, which can reflect the surface heat transfer coefficient, in the three curves approximately appear in a range from 110 degrees to 125 degrees, that is, as the Reynolds numbers Re increase, the peaks of the Nusselt number Nu are also gradually increased. In the present application, the angle corresponding to the above "peak" is just the key of the present application. The solution in the present application is to select the angle corresponding to the "peak" as a target laying angle, and the position corresponding to the target laying angle is just the target laying position of the conductors 300.

It may be understood that, the position of the peak is clearly corresponding to the position of the turbulent flow detachment as referred to in the above theoretical analysis, that is, the position corresponding to the best heat exchange effect. The curve diagram of FIG. 5 actually verifies the phenomenon of turbulent flow detachment as referred to in FIG. 4-1 and FIG. 4-2. After obtaining the curve diagram of FIG. 5 through the test data, the target laying position can be obtained. Obviously, the target laying angle is an angle between the position of the normal vector of the contact surface, where the windward side incoming; flow comes into contact with the tower wall 100, and the position where the surface heat transfer coefficient is the highest, and reference may be made to FIG. 6-3 and FIG. 7-3.

It can be seen from the above analysis that, in this embodiment, not only the conductors 300 are laid at the shady side of the tower wall 100 to dissipate heat by utilizing the cold source at the low temperature side, most importantly, the specific position for laying the conductors 300 at the shady side is precisely determined. That is, in this embodiment, the power transmission conductor 300 is targetedly arranged at a specified position at the shady side (which is actually the position of the turbulent flow detachment and also the position where the surface heat transfer coefficient is the highest), thereby more efficiently utilizing the "cold source", and further realizing the effect of reducing the internal temperature.

Specifically, in this solution, each of the air flow parameters for acquiring the Nusselt number Nu or the Reynolds number Re can be obtained according to the weather wind rose of the region where the tower is located.

Figures 1, 6:
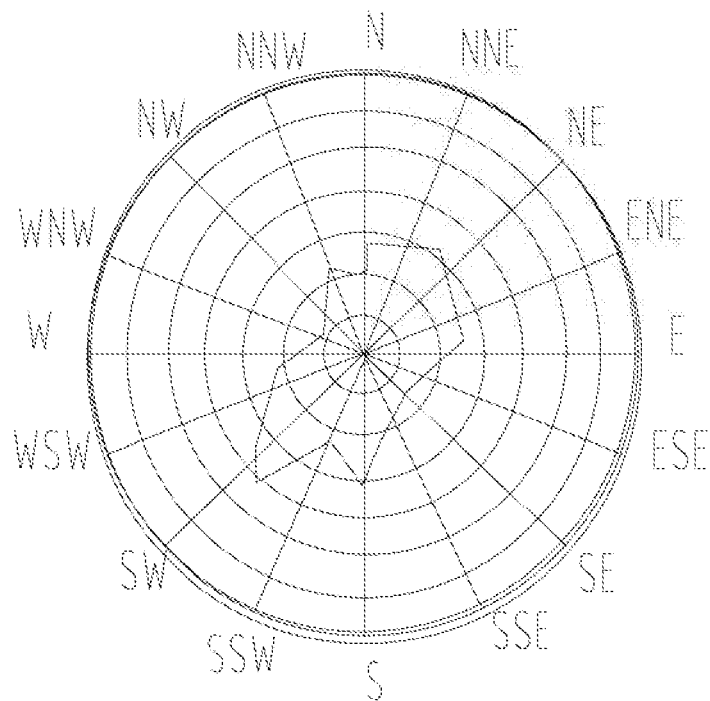
Figures 2, 6:
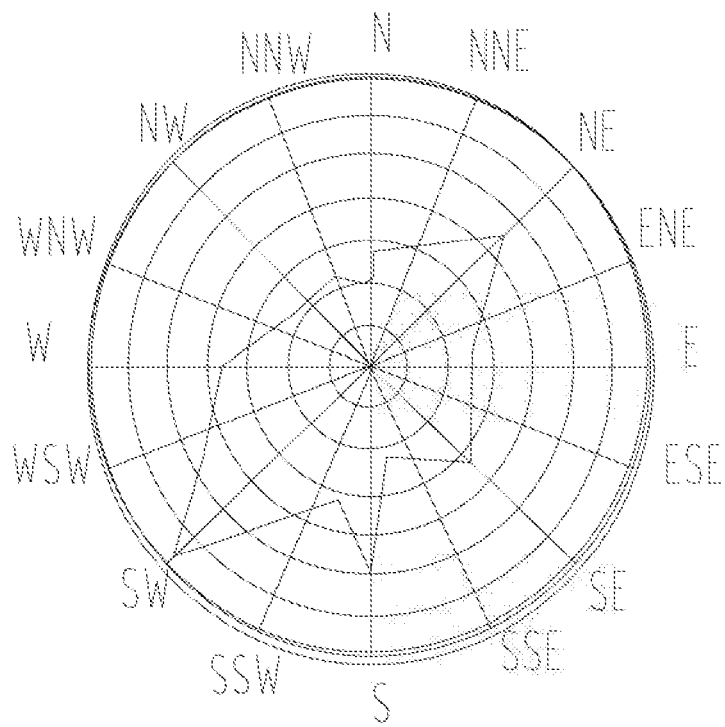
Figures 3, 6:
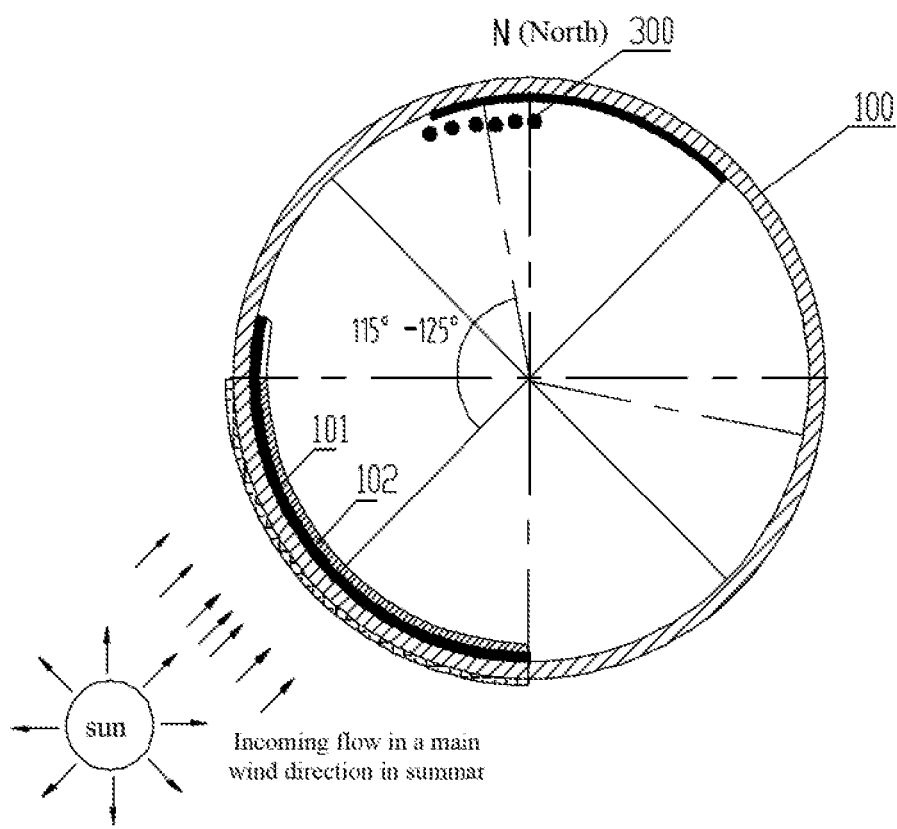

Referring to FIGS. 6-1, 6-2, 6-3, FIG. 6-1 is a wind rose at an height of 10 meters of a wind farm in summer (from June to August); FIG. 6-2 is a wind rose at an height of 70 meters of the wind arm in FIG. 6-1 in summer (from June to August); and FIG. 6-3 is a schematic view of a first embodiment for laying power transmission conductors 300 in accordance with the wind rose in FIG. 6-1 of a location where the wind farm is located in summer (from June to August).

It can be seen from the wind roses in FIG. 6-1 and FIG. 6-2, the incoming flow in a main wind direction of the air flow comes from the southwest direction (SW direction), which has a high wind speed (from June to August in summer, also has a high temperature). Here, when obtaining a target laying position, the incoming flow in the main wind direction is selected as the windward side incoming flow, to obtain the corresponding surface heat transfer coefficient of the outer surface at the shady side. Regarding the incoming flow in the main wind direction shown in the wind roses, the wind speed in this wind direction is the highest, and the frequency of occurrence of wind coming from this wind direction is also the highest, and obviously, the effect of the turbulent flow in the main wind direction is also the most significant, thus the target laying position obtained in this way can achieve high efficiency in heat transfer to the maximum extent, which is also the main value of the wind roses. That is, in situations of changeable weather and changeable windward side incoming flow, the windward side incoming flow the incoming flow in the main wind direction), which is most worthy to be used, is selected through the wind roses, to ensure that the target laying position obtained finally is the best laying position. In addition, the wind rose adopted here is a wind rose from in summer from June to August, and is actually a whether wind rose of a high temperature season. It may be appreciated that, the temperature rise phenomenon inside the tower in the high temperature season is more obvious, and the demand for cooling the conductors 300 by heat exchanging is also the most urgent. Here, the wind rose from June to August is chosen, and obviously, according to the geographical environments, it may choose a wind rose of months corresponding to a high temperature season of a practical geographical location.

With reference to the wind roses, a target laying angle can be determined after obtaining the curve diagram of the Nusselt number Nu versus the angle as shown in FIG. 5, the target laying angle ranges from 115 degrees to 125 degrees as shown in FIG. 6-3. Generally, there are several power transmission conductors 300, and middle portions of the several power transmission conductors 300 are arranged to correspond to the selected target laying angle, which is equivalent to lay the conductors 300 at the target laying position.

Figures 1, 7:
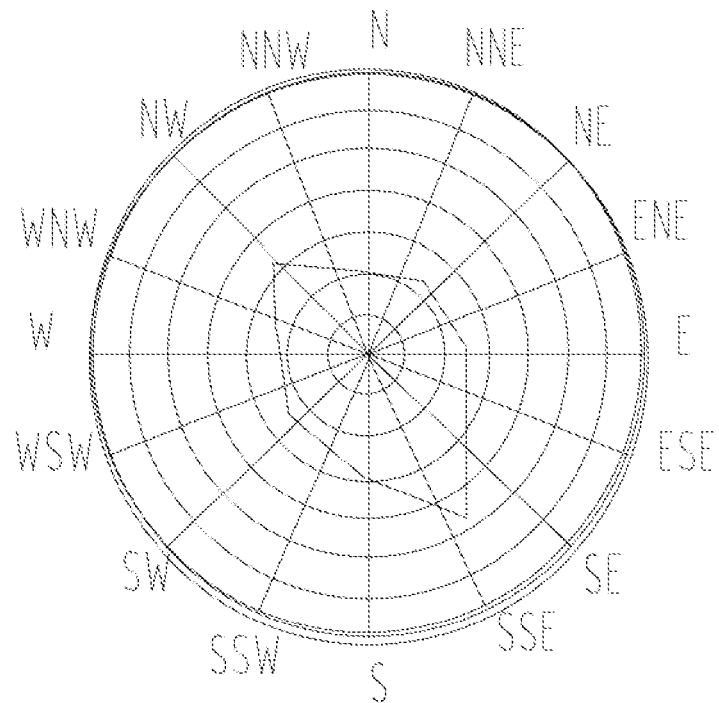
Figures 2, 7:
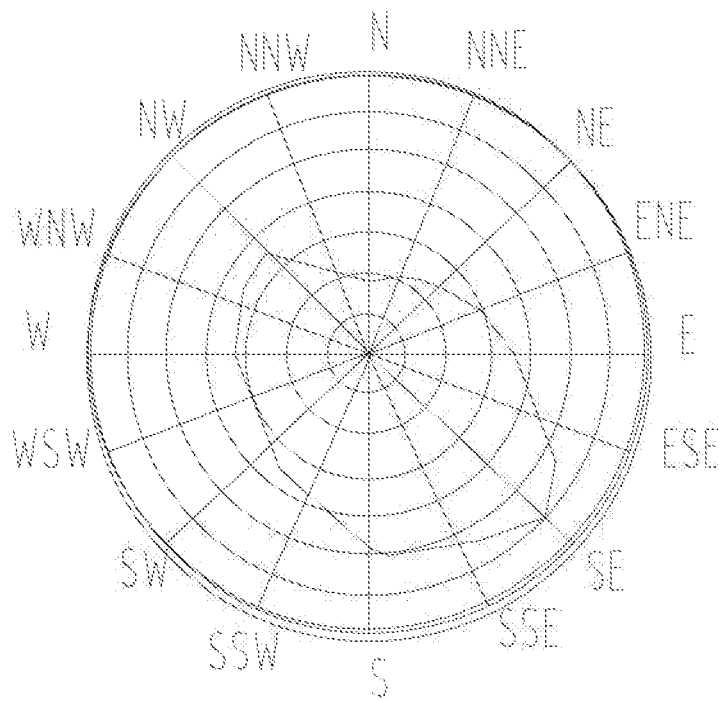
Figures 3, 7:
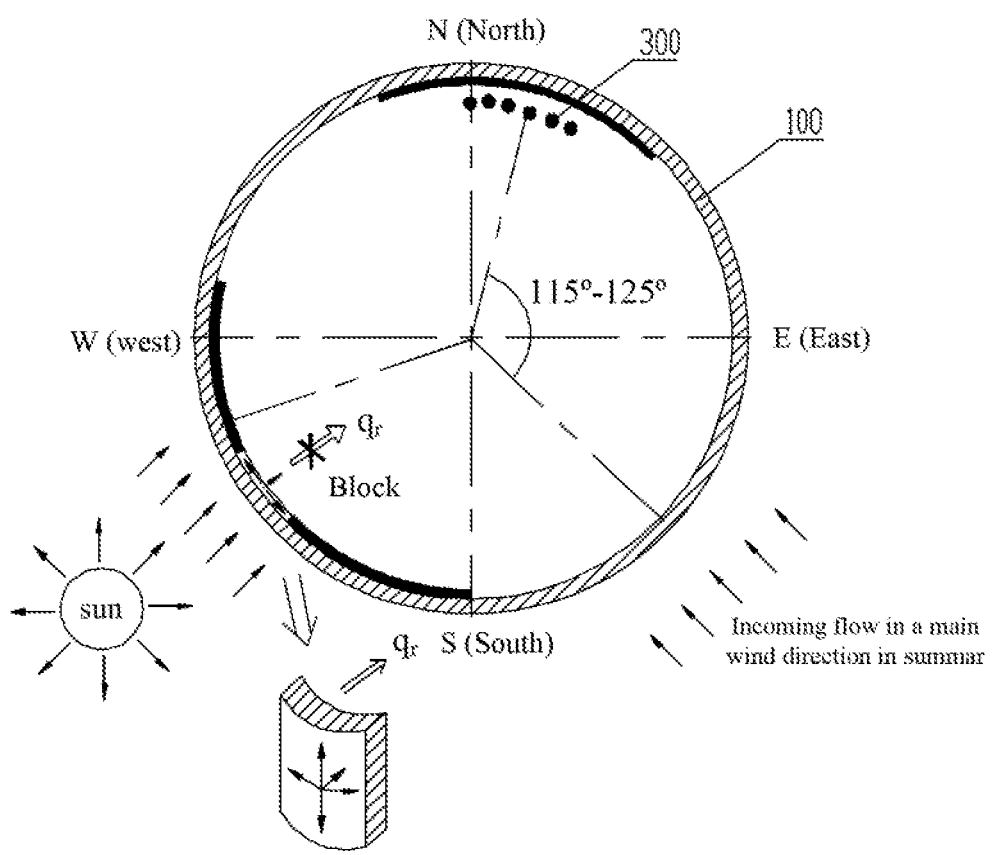

Reference is further made to FIG. 7-1, FIG. 7-2 and FIG. 7-3. FIG. 7-1 a wind rose at an height of 10 meters of a wind farm in summer (from June to August); FIG. 7-2 is a wind rose at an height of 70 meters of the wind farm in FIG. 7-1 in summer (from June to August); and FIG. 7-3 is a schematic view of a second embodiment for laying power transmission conductors 300 in accordance with the wind rose in FIG. 7-1.

As illustrated in the wind roses in FIG. 7-1 and FIG. 7-2, the incoming flow in the main wind direction of the air flow comes mainly from the southeast direction (SE direction), and has a high wind speed (also has a high temperature in summer from June to August). In this embodiment, the incoming flow in the main wind direction is also taken as an object to obtain the Nusselt number Nu, and the principle is described above. With reference to the wind roses, the target laying angle can also be determined after obtaining the curve diagrams of the Nusselt number Nu versus the angle as shown in FIG. 5, and the target laying angle also ranges from 115 degrees to 125 degrees.

Figures 1, 8:
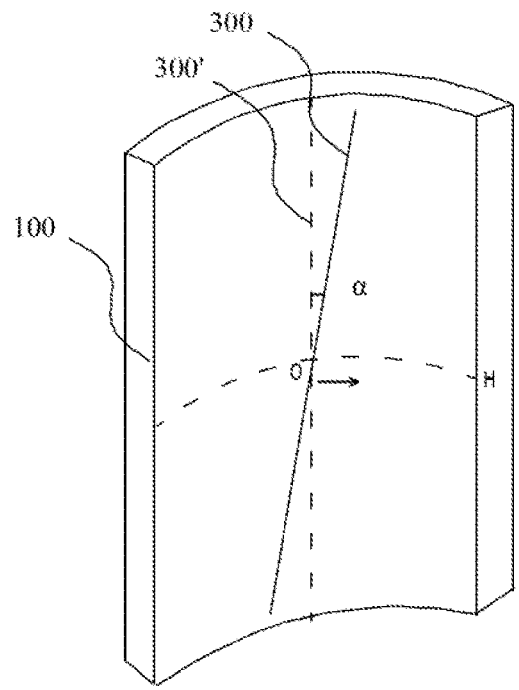
Figures 2, 8:
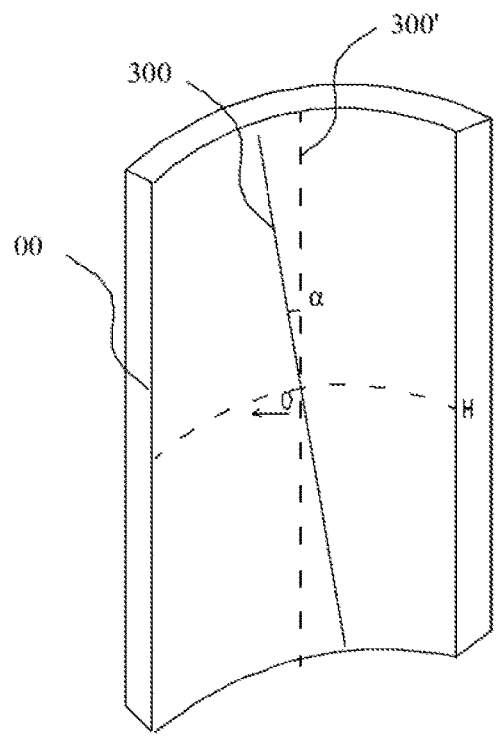
Figures 3, 8:
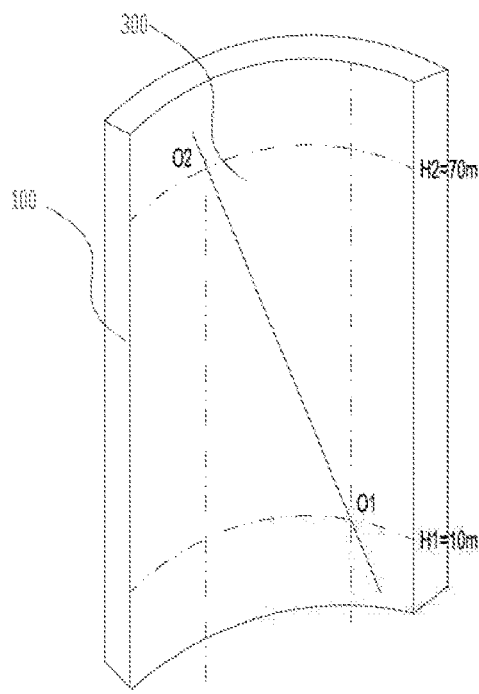
Figures 4, 8:
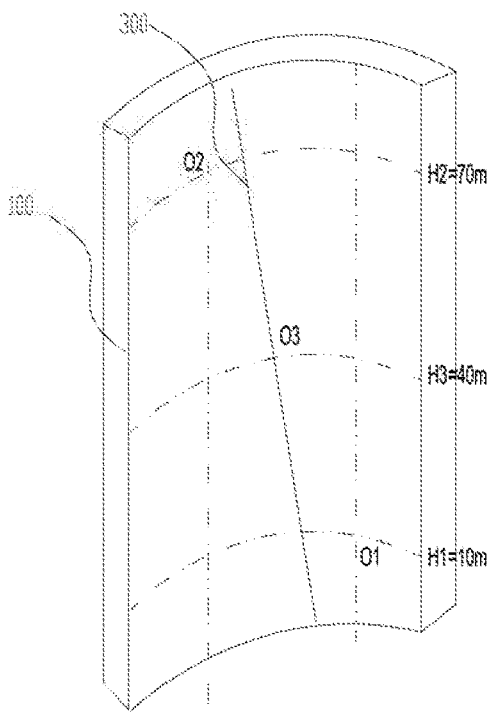

Reference is further made to FIG. 8-1 and FIG. 8-2, FIG. 8-1 is a first schematic view showing assisting in laying and orientating the conductors 300 according to the wind roses; and FIG. 8-2 is a second schematic view showing assisting in laying, and orientating the conductors according to the wind roses.

In the above embodiment, the wind roses at the height of 10 meters and the height of 70 meters of the tower are selected to obtain corresponding. Nusselt numbers Nu and the Reynolds numbers Re. It may be understood that, in ideal conditions, the Reynolds numbers Re at different heights of the tower should be obtained as much as possible, to establish corresponding curves of Nusselt numbers Nu versus the angles, to further determine the laying extension direction of the conductors 300.

However, for the tower at the same site, the changes of the Reynolds numbers Re at different heights of the tower present a certain regularity, since as the height increases, the air flow rate and the tower diameter and the like will change relatively regularly. In accordance with the changes of the surface heat transfer coefficient at different Reynolds numbers Re, the target laying position has in fact a range value, for example, the range from 110 degrees to 125 degrees. In this case, assuming that the selected position is 120 degrees, in fact, the conductors 300 are just located at the position corresponding to a high heat exchange efficiency which is the object of this solution. However, in order to make the laying position of the conductors 300 more accurate, a finer adjustment may be made according to the change rule of the Reynolds numbers Re.

As shown in FIGS. 8-1 and 8-2, according to the climatic environment in which the tower is located, the Reynolds numbers Re corresponding to different heights of the tower may gradually increase or decrease from bottom to top. Accordingly, the corresponding Nusselt number Nu may also change in value accordingly. The conductor 300 may be laid at a selected target laying position and then the conductor 300 may be rotated by a predetermined angle clockwise or counterclockwise according to the change rule of the Reynolds numbers Re. In this case, actually, it is only required to select a height position (the height H as shown in the figure), and then obtain the Reynolds number Re of the circumferential position corresponding to the height position and to obtain the curve of the Nusselt numbers Nu versus the angle, and in this case, a position having the highest surface heat transfer coefficient on the circumferential position can be obtained, and an inner side position, corresponding to the obtained position, of the tower wall 100 is just the position O as shown in the figure. A vertically extending line at the position O is taken as a reference laying line 300', and then, a fine adjustment (rotating clockwise or counterclockwise by a certain angle) is made according to the change rule (also reflecting the change rule of the surface heat transfer coefficient) of the Reynolds numbers Re corresponding to portions above and below the position O, and thus the target laying position required actually can be obtained without requiring to calculate the Nusselt numbers Nu at multiple Reynolds numbers Re, thereby simplifying the obtaining process of the target laying position, and also ensuring the accuracy of the laying position of the conductors 300.

In the above embodiment, a reference laying line 300' is obtained according to a certain position, and then the reference laying line 300' is finely adjusted according to the change rule. In practice, there are many other ways to achieve efficient acquisition of the target laying position, which can also ensure the selection of the target laying position to be accurate.

For example, as shown in FIG. 8-3, FIG. 8-3 is a third schematic view showing assisting in laying and orientating the conductors according to wind roses.

The above wind roses at the heights of 10 meters and 70 meters are still taken as examples, a position having the highest surface heat transfer coefficient on each of the circumferential positions respectively corresponding to the heights H1 of 10 m and H2 of 70 m can be obtained. The inner side positions, corresponding to the obtained positions having the highest surface heat transfer coefficients, of the tower wall 100 are respectively O1 and O2 as illustrated in the figures, and the path of the target laying position extends from O1 to O2.

Further as shown in FIG. 8-4, FIG. 8-4 is a fourth schematic view showing assisting in laying and orientating the conductors according to wind roses.

The above wind roses at the heights of 10 meters and 70 meters are still taken as examples, a position having the highest surface heat transfer coefficient on each of the circumferential positions respectively corresponding to the heights H1 of 10 m and H2 of 70 m can be obtained. The inner side positions, corresponding to the obtained positions having the highest surface heal transfer coefficients, of the tower wall 100 are respectively O1 and O2 as illustrated in the figures (which are embodied as the laying angles), and then an average value (a laying angle corresponding to position O3) is obtained by averaging the laying angles corresponding to positions O1 and O2. At the middle position (H3=40 m as shown in the figure), the vertically extending line corresponding to the position of the average value is taken as a reference laying line 300', and then the reference laying line 300' is twisted by a corresponding angle α according to the change trend of the positions O1 and O2, to obtain the path of the target laying position. The laying path in FIG. 8-3 can be directly taken as a reference laying line, and then the reference laying line is twisted by a certain angle according to the change trend of the positions O1 and O2. The above solutions can both enable the laid conductors to be basically located at the position having the high surface heat transfer coefficient.

The selected heights of 10 meters and 70 meters respectively represent the upper feature and the lower feature of the tower. The tower part below the height of 10 m may be subjected to interference from other constructions and be difficult to obtain an effective surface heat transfer coefficient, the air flow pattern at the position above 70 m has no significant change relative to the air flow pattern at the height of 70 m, thus for a normal tower in the conventional technology, the selection of 10 m and 70 m has a certain representativeness, and can be used as a preferred reference point for the target laying position.

It may be understood that, in the above embodiments, in the process of acquiring the position corresponding to the highest surface heat transfer coefficient, the Reynolds number Re is used, and the target laying position is obtained according to the change relationship between the Nusselt number Nu and the angle at different Reynolds numbers Re. That is, the key of the present application is to obtain the position corresponding to the highest surface heat transfer coefficient according to the ambient air flow parameters. However, multiple air flow parameters are constantly changing, and when calculating the surface heat transfer coefficient in a certain season or even in a certain period of time, the acquisition process is complicated, in the case that the Reynolds numbers Re are taken as the reference dimension to obtain the surface heat transfer coefficient, since the air flow at the same Reynolds number Re has the same flowing pattern, the corresponding surface heat transfer coefficient is therefore substantially at the same level, and there is no need to calculate multiple sets of data due to the changeable air flow parameters (for example, if the above four air flow parameters are directly used the acquiring process, it may be required to count numerous sets of data combinations in a day, however, if the acquiring process uses the Reynolds numbers Re, it may only need to count several sets of data), thus simplifying the process for obtaining the target laying position.

It is to be noted that, in order to utilize the cold source at the shady side, the premise is to lay the conductor 300 at the shady side, and the shady side is preferably defined as a range from 45 degrees clockwise with respect to the due north direction to 45 degrees counterclockwise with respect to the due north direction if the target laying angle obtained according to the above method is not within this range, the acquiring step should be checked to ensure that the target laying angle is within that range.

In the above embodiments, it is focused on how to lay and position the power transmission conductor 300 at the shady side to utilize the "cold source" of the shady side most efficiently, and the following embodiment will further improve the efficient use of the "cold source" of the shady side on this basis.

Figures 1, 9:
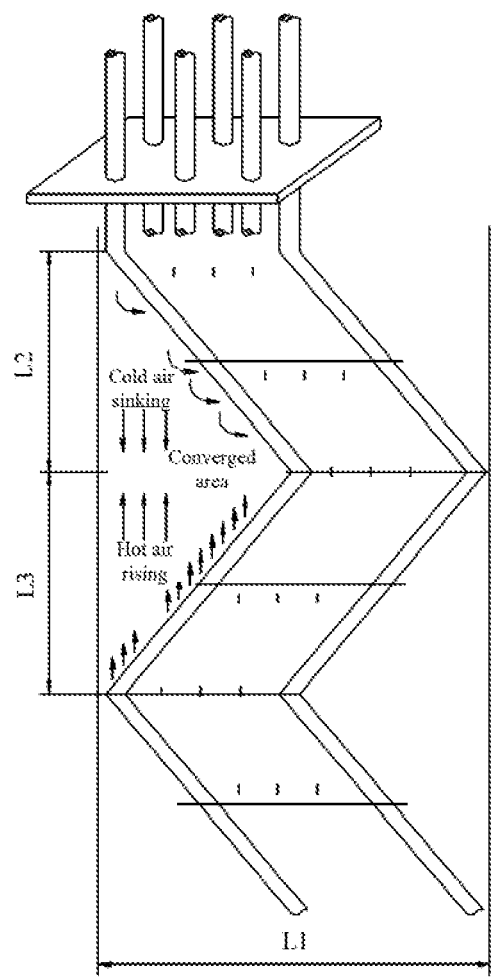
Figures 2, 9:
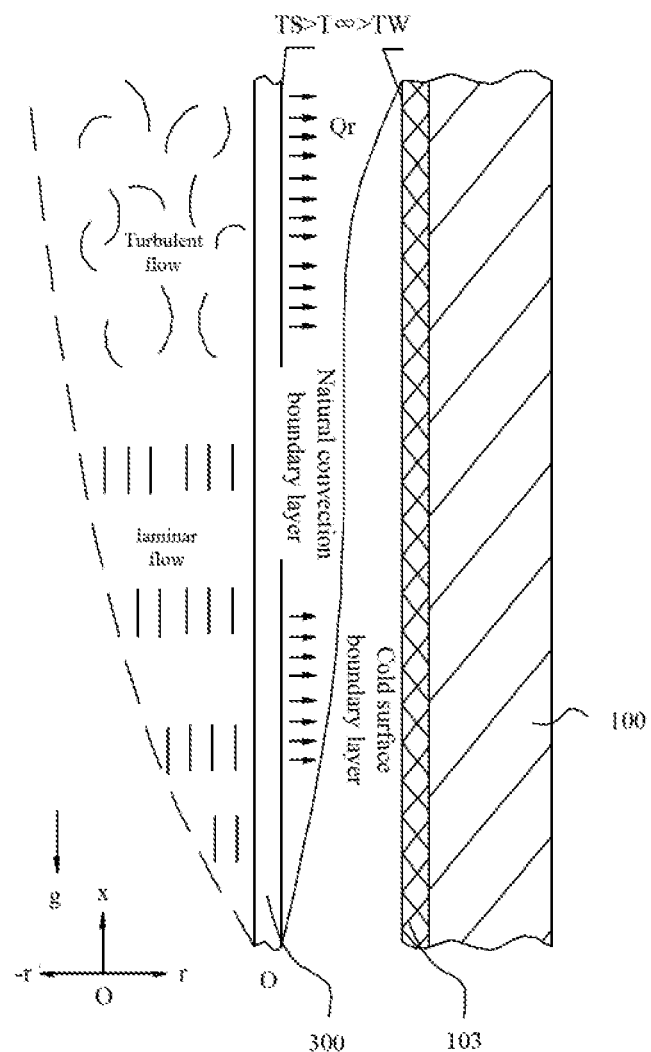
Figures 3, 9:
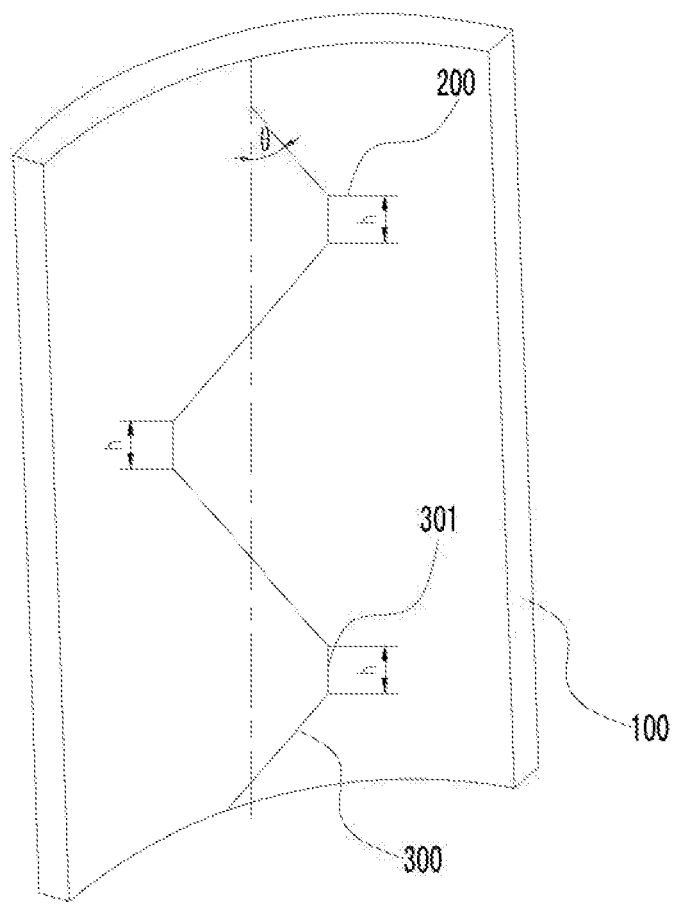
Figures 4, 9:
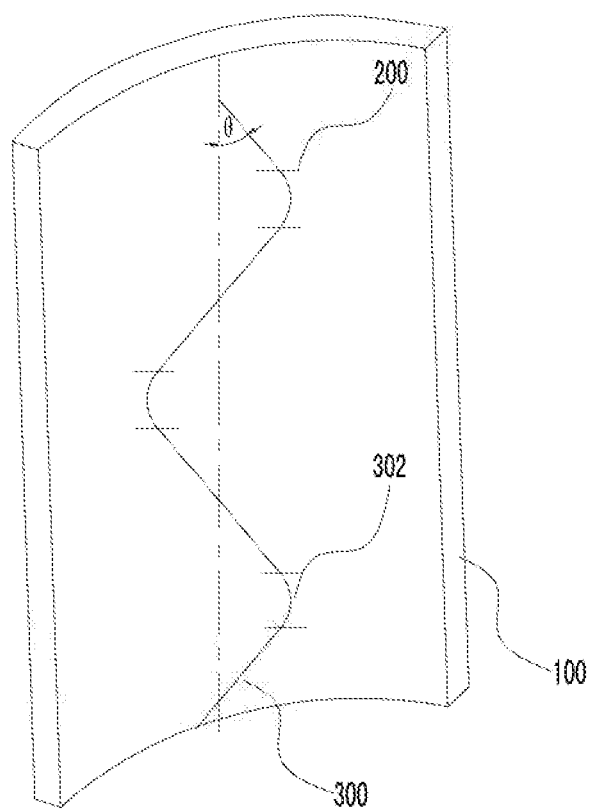

Referring to FIG. 9-1 and FIG. 9-2, FIG. 9-1 is a schematic view showing a first structure of the power transmission conductors 300 being laid inside the wind turbine tower according to the present application; and FIG. 9-2 is a diagram showing the principle of heat transfer between a tower side wall and the power transmission conductor 300 in FIG. 9-1.

As can be seen from the figures, with reference to the inner surface of the tower, the power transmission conductors 300 are laid in a manner being bent back and forth to form the zigzag shape as shown in FIG. 9-1. Taking FIG. 9-1 as a view angle, it is equivalent that the power transmission conductors 300 swing leftwards and rightwards in a back and forth manner, which is different from the vertical laying manner in the conventional technology.

Thus, the length of the power transmission conductor 300 in the circumferential direction of the tower is actually increased, which enables more cold air of the boundary layer of the tower wall 100 to be disturbed, and thus the cold air driven to participate the heat exchange is also increased. In the conventional technology, the vertically arranged conductor 300 has a limited length in the circumferential direction and the range for influencing the heat exchange is limited, and thus the cooling capacity stored in the "cold source" is still large and is not fully utilized. The back and forth bending arrangement in this solution obviously more sufficiently uses the "cold source" near the tower wall 100, which, combined with the laying positioning described above, makes the utilization of the "cold source" to be more efficient and active.

In addition, in the case that the circumferential length of the conductor 300 on the tower wall 100 is increased to drive more cold air to participate in the heat exchange, the actual length increment of the conductor 300 is little actually.

Reference is made to the following table:

|  | $\theta$ | | | | | |
| --- | --- | --- | --- | --- | --- | --- |
|  | 5° | 6° | 7° | 8° | 9° | 10° |
| Cos θ | 0.996 | 0.994 | 0.992 | 0.990 | 0.987 | 0.984 |

With reference to FIG. 9-1, θ is an included angle between the conductor 300 and the vertical direction, the actual length L1 of the conductor 300 is approximately equal to L2/cos θ, and thus, the total length will only increase by about 1.6% even if the bending angle reaches 10 degrees, and obviously there is no need to consider the increased cost of the conductor 300. However, though the length of the conductor 300 is increased very little, the heat exchange area can be greatly increased.

Reference is further made to the table below. Assuming that an upper bending portion and an adjacent lower bending portion of the conductors 300 are spaced apart at a distance of L2=5000 mm, the original circumferential length of the group of the conductors 300 is L=600 mm.

|  | $\theta$ | | | | | |
| --- | --- | --- | --- | --- | --- | --- |
|  | 5° | 6° | 7° | 8° | 9° | 10° |
| tg θ | 0.087 | 0.105 | 0.123 | 0.140 | 0.158 | 0.176 |
| L2tg θ | 8.7% L2 | 10.5% L2 | 12.3% L2 | 14% L2 | 15.8% L2 | 17.6% L2 |

-continued

| | θ | | | | | |
|---|---|---|---|---|---|---|
| | 5° | 6° | 7° | 8° | 9° | 10° |
| 5000 tgθ | 435 | 525 | 615 | 700 | 790 | 880 |
| circumferential length corresponding to the cold wall surface | 1035 | 1125 | 1215 | 1300 | 1390 | 1480 |
| increased multiple of the circumferential length corresponding to the cold wall surface | 1.72 | 1.875 | 2.025 | 2.167 | 2.317 | 2.467 |

It can be seen that in this embodiment, the length in the circumferential direction can be increased by nearly two times or more times in terms of the cold region participated in the heat exchange, and when the large area of cold air is driven and moved, the large quantity of cold air being driven performs natural convection heat exchange with the tower wall 100 at the shady side in a region with a larger area. According to the Newton's Law of Cooling equation: $\varphi_c = hA$ $(t_p - t_w)$ indicates the convective surface heat transfer coefficient of a substance, A indicates a heat transfer contact area, and $t_p - t_w$ indicates the temperature difference), it is obvious that the heat of the conductors 300 can be absorbed by a large area of cold air, and be transferred to the tower wall 100 with a large area in a manner of naturally convection heat exchange, which can be greatly improve the heat exchange rate and accelerate the heat dissipation of the conductors 300, and thus, the heat dissipation of other heat source components can be accelerated accordingly.

It is to be noted that, in this embodiment, the heat exchange efficiency is improved not simply by increasing the circumferential length, corresponding to the tower wall 100, of the conductor 300, and reference is made to FIG. 9-1 and FIG. 9-2.

The conductor 300 is a heat source, and heat of the conductor 300 has an upward buoyant force, and when the heat floats upwards, the region below the heat will be supplemented by a cold air with a higher density, to form a cold air sinking region and a hot air rising region as shown in FIG. 9-1, that is, an approximate triangular region formed with respect to a bending unit, and a horizontal extension line of the bent position of the bending unit is a dividing line for dividing the cold air sinking region and the hot air rising region take, a part above the dividing line is basically the cold air sinking region, and a part below the dividing line is basically the hot air rising region. The sinking cold air flow and the rising hot air flow are converged at the dividing line, thereby preventing the rising hot air flow from rising further.

In the case of the conductors being arranged in the vertical arrangement in the conventional technology, the air heated by the surface of lower segments of the conductors 300 is continuously moved upward to create a "enclosing" phenomenon to upper segments of the conductors 300, which restricts the cold air around the upper segments of the conductors 300 from participating in the convection cooling. However, with the laying method in the back and forth bending manner as described above, it can be seen from the above analysis that the rising hot air from the lower segments of the conductors may actually be stopped by the sinking cold air above the rising hot air, thereby preventing the hot air at the lower segments of the conductors from enclosing the upper segments of the conductors, improving the heat exchange effect of the whole conductors 300 and intensifying the uniformity of the heat exchange.

In addition, when laying the conductors 300, the conductors 300 do not need to be perpendicular to the ground, but can be laid along the tower wall 100 from top to bottom. Since the inner diameter of the tower is gradually reduced from bottom to top, the bending units do not overlap with each other when viewing the conductors 300 from above, so that the rising hot air flow from the lower segments of the conductors 300 sweeps over the upper segments of the conductors 300 at a low overlapping degree, thus further reducing the disadvantageous effects of the enclosing phenomenon, and the rising hot air flow from the conductors 300 may correspondingly sweep upward directly to the tower wall 100 thereby further improving the heat exchange efficiency between the hot air and the cold air.

Alternatively, the conductors 300 may also be laid substantially along an arc-shaped wall surface of the tower wall 100, to increase the area of convection heat exchange between the conductors 300 and the tower wall 100 as much as possible. That is, viewing the conductors 300 as a whole, in the circumferential direction, the conductors 300 has a radian approximate to a radian of the inner surface of the tower wall 100, and in an extending direction from top to bottom, the conductors 300 substantially has an inclination degree approximate to the inclination degree of the tower wall 100.

The structural forms of the bending units laid in the back and forth bending manner are various, which are not limited to the bending structure as shown in FIG. 9-1. As shown in FIG. 9-3 and FIG. 9-4, FIG. 9-3 is a schematic view showing a second specific structure of the power transmission conductors 300 being laid inside the wind turbine tower according to the present application; FIG. 9-4 is a schematic view showing a third specific structure of the power transmission conductors 300 being laid inside the wind turbine tower according to the present application. Obviously, the part of the tower wall 100 illustrated in each of FIG. 9-1 to FIG. 9-4 is at the shady side.

As can be seen from FIG. 9-3, when laying the conductor 300, the conductor 300 is not bent directly, and its bent position is actually provided with a linear segment 301 for transition, and a distance h of the linear segment 301 can be adjusted to allow the bending unit to be in a trapezoidal structure. In FIG. 9-4, the bending position is designed to have an arc shape, and the bending position is an arc-shaped segment 302, and the other segments in the bending unit are linear segments. It can be understood that S-shaped bending is also feasible. The bending position can be fixed by a clamping plate 200, and if the conductor segment other than the bending portion is long, several clamping plates 200 may be provided additionally for fixing these long conductor segments, and the arranging position and the number of the clamping plates 200 can be set according to the requirement for reliable fixing the conductor segments.

Compared with the direct bending manner, the bending manners having a transitional segment (including trapezoidal, S-shaped, arc-shaped bending position) allows the upper conductor segment and the lower conductor segment in the bending unit to be spaced apart at a certain distance, thereby reducing the effect of close range radiation from the lower conductor segment to the upper conductor segment caused by the bending angle. The bending unit designed as the S shape or only the bending position designed as an arc-shaped segment can facilitate thermal expansion and contraction of the bending position compared with as the bending unit in the trapezoidal shape.

In the above embodiments, the laying position of the conductor 300 is precisely determined, and the bending treatment is further performed to the structure of the conductor 300, thus a great cooling and heat exchanging effect can already been obtained. Furthermore, a further improvement to the structure of the conductor 300 is made according to the present application.

Figures 1, 10:
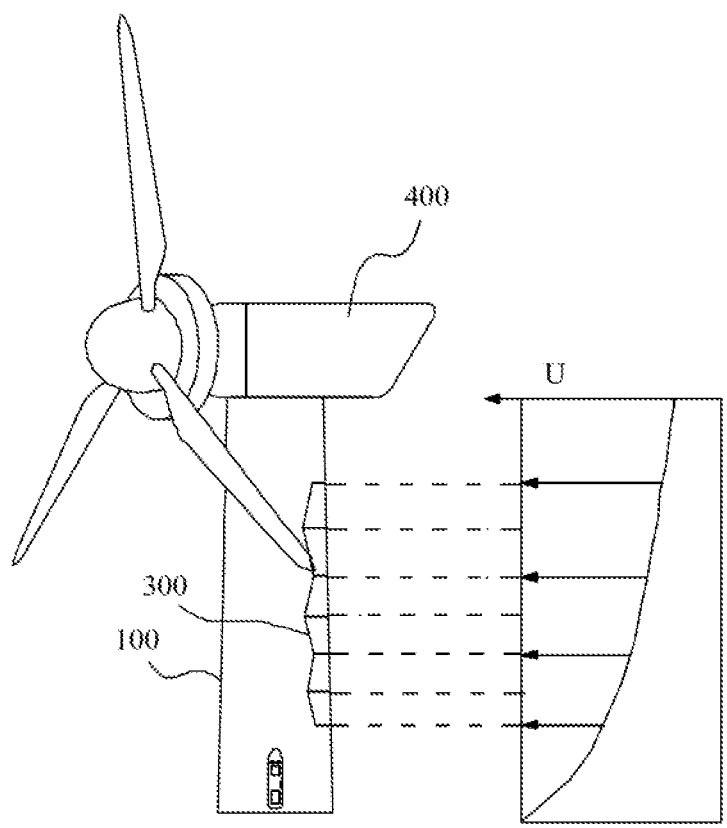
Figures 2, 10:
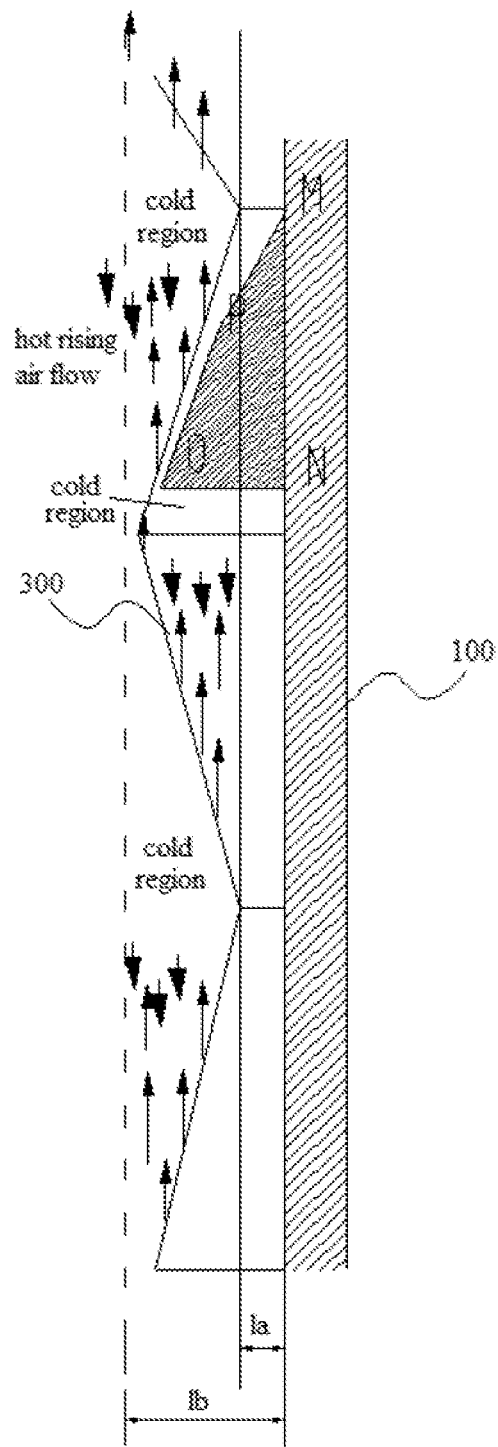
Figures 3, 10:
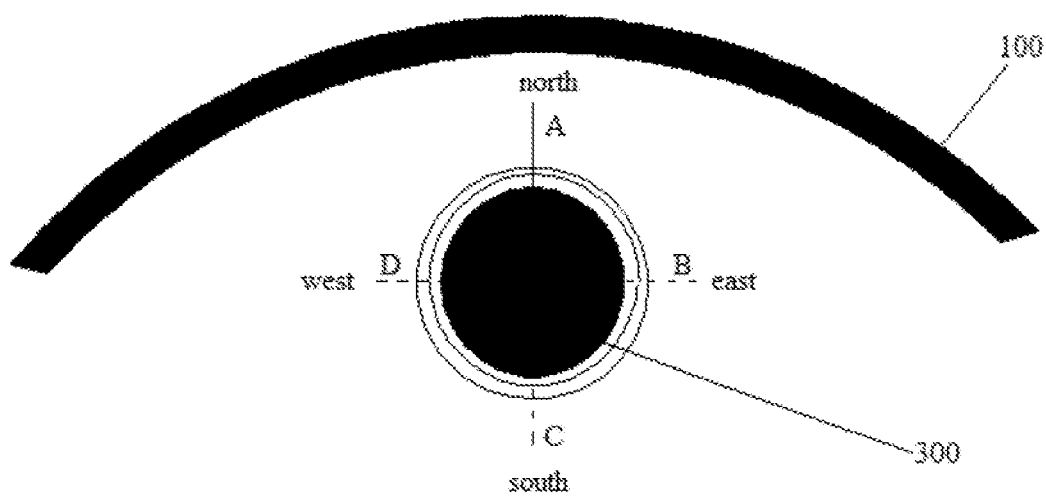
Figures 4, 10:
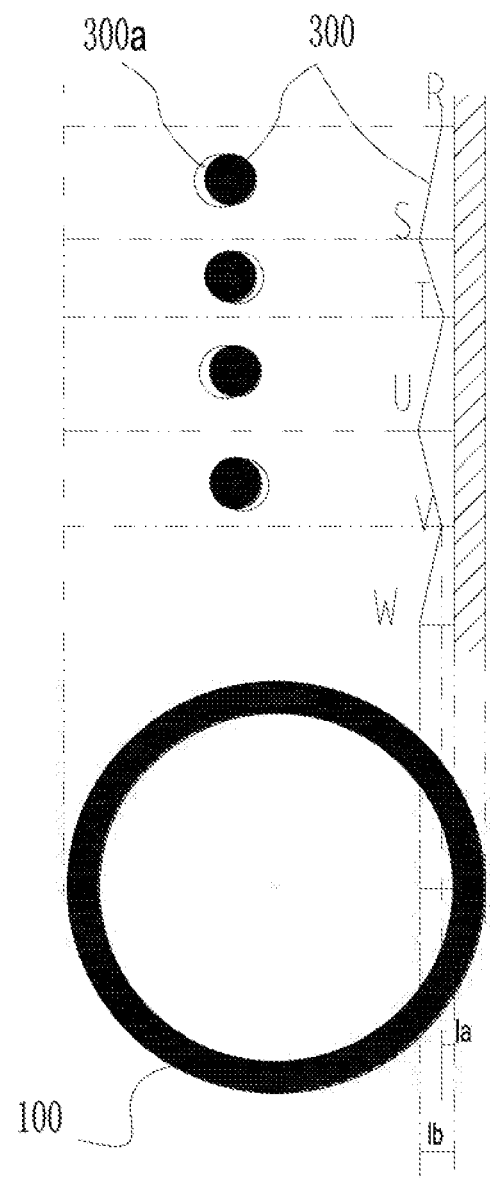
Figures 5, 10:
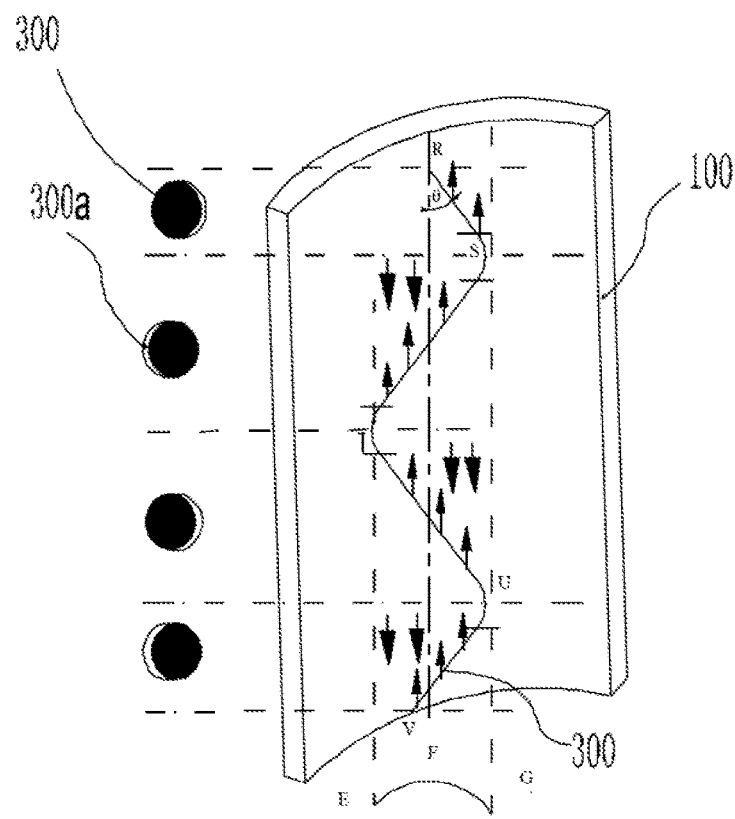
Figures 6, 10:
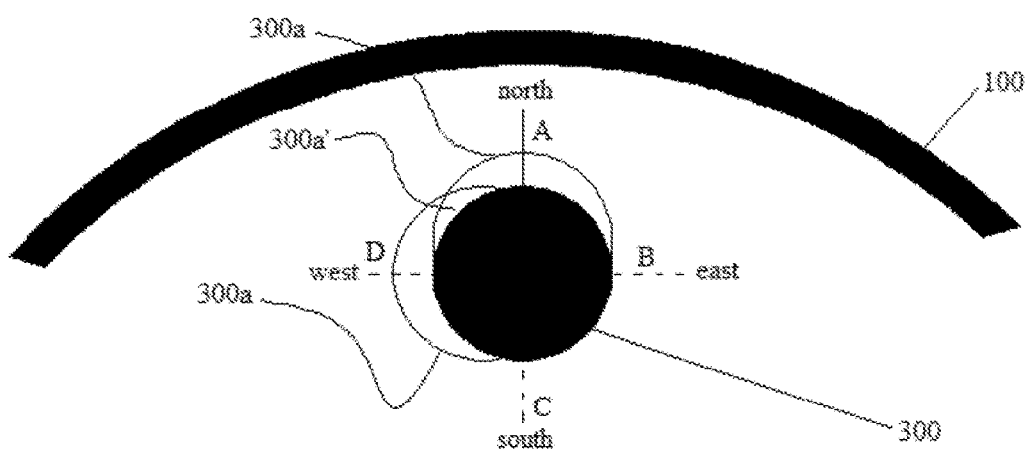

Referring further to FIG. 10-1, FIG. 10-1 is a schematic view showing the structure of an embodiment of a wind turbine tower according to the present application.

The figure shows the entire wind turbine, including the tower and a nacelle 400. As can be seen from the figure (U indicates the wind speed), a vertical distance from the conductor 300 to an inner surface of the tower wall 100 in an extending direction of the conductor 300 has an alternate change tendency, i.e., the vertical distance from the conductor 300 to the inner surface of the tower wall 100 is changed from top to bottom in an alternate tendency of being increased first, and then reduced, then increased, and again reduced, and repeating the cycle, it may also be in a tendency of being reduced first, and then increased and repeating the cycle, and the alternate change of the distance may be a regular periodic change or an irregular periodic change, and the peak values of the distance in the cycles may be equal or not equal to each other. When the alternate change of the vertical distance from the conductor 300 to the inner wall of the tower wall 100 is to be embodied as bending of the structure, this can be realized by clamping plates or holders.

If the bending effect of projection of the conductor 300 on the inner surface of the tower wall 100 is not considered, when the vertical distance from the conductor 300 to the inner surface of the tower wall 100 changes alternately, the projection of the conductor 300 on a longitudinal section (a section in a radial direction) of the tower is specifically presented as bending lines bent back and forth. As shown in FIG. 10-1, obviously, the bending is not limited to the bending of linear segment, it may also be bending of arc-shaped lines or other curved lines.

It may be understood that the laying solution of the conductor 300 in this case is: the power transmission conductor 300 is bent back and forth when being projected on the tower wall 100; and the power transmission conductor 300 is also bent back and forth when being projected to the longitudinal section of the tower, and the whole conductor 300 is in a twisted form.

Reference is made to FIG. 10-2, which is a diagram showing heat transfer analysis of natural convection of the conductor 300 in FIG. 10-1.

It can be seen from FIG. 10-2 that, 1*a* indicates a boundary thickness of the airflow which can drive the air near the inner surface of the tower to participate in heat exchange in the conventional technology (using vertically laying method), and 1*b* indicates a boundary thickness of the air flow which can drive the air near the inner surface of the tower to participate in heat exchange in this solution. The analysis here is similar to the principle of the above bending back and forth in the circumferential direction, that is, this solution can drive more cold air to participate in the heat exchange, to improve the cooling efficiency.

In addition, the approximate triangular region formed by the bending may also form a cold air sinking region (the cold region shown in the figure) and a hot air rising region, thereby preventing the rising hot air flow from the lower segment of the conductor 300 from moving upward to enclose the upper segment of the conductor 300. In addition, since the conductor 300 has an extending direction substantially coincident with an extending direction of the tower wall 100 and does not overlap in the vertical direction, thus the influence of the enclosing phenomenon can be further reduced from the perspective of the radial section, and the hot air flow may partially flow directly to the tower wall 100, to enhance the heat exchange effect.

It is clear that, in this solution, the vertical distance from the conductor 300 to the inner surface of the tower wall 100 is changed alternately, and the conductor 300 is also bent back and forth in a circumferential direction of the tower wall 100, such that the conductor 300 is laid in a twisted manner, which greatly improves the heat exchange effect. More importantly, the arrangement manner that the distance from the conductor 300 to the inner surface of the tower wall 100 change alternately not only further improves the heat exchange effect.

Referring to FIG. 10-3 to FIG. 10-4, FIG. 10-3 is a diagram showing the position relationship of the tower wall 100 with the conductor 300 and its air boundary layer in FIG. 10-1 and FIG. 10-4 is a diagram showing growth analysis of a boundary layer of the conductor 300 in FIG. 10-2.

FIG. 10-4 also takes the perspective of FIG. 10-1 or FIG. 10-2 as the view angle (the black ring at a lower portion of FIG. 10-4 is a schematic top view of the tower). Since the vertical distance from the conductor 300 to the inner surface of the tower wall 100 is changed alternately, which is presented as that the conductor 300 is bent back and forth on the longitudinal section of the tower wall 100, and the boundary layer of the conductor 300 also changes periodically. For a VU segment of the conductor 300, its hot air flow rises to a position near the arc DAB (west north east) to form a crescent-shaped boundary layer 300*a* shown in the figure. For a UT segment of the conductor 300, due to the convergence of the cold and hot regions, the boundary layer of the arc DAB stops growing, and becomes a cold region, and a crescent-shaped boundary layer 300*a* begins to grow at an arc DCB (west south east) at the opposite side of the arc DAB, and the growth of boundary layer is repeated from bottom to top to change alternately at the arc DAB and the arc DCB.

That is, the cold region and the hot region of the conductor 300 actually change alternately from the perspective of FIG. 10-4.

Further referring to FIG. 10-5, FIG. 10-5 is an analysis diagram of growth of a boundary layer of the conductor 300 in FIG. 10-1 viewed in another view angle, and the analysis graph is shown in the circumferential wall surface of the tower.

Also, the description is made with reference to the orientation in FIG. 10-3, and similar to the principle in FIG. 10-4, the re-growth and stopping growth of the boundary layer may occur alternately at the arc ADC (north west south) and the arc ABC (north east south) of conductor 300 in FIG. 10-5. The conductor 300 also has a phenomenon in which the hot and cold surfaces are alternately changed, but the hot and cold surfaces in FIG. 10-5 is exactly deviated from the hot and cold surfaces in FIG. 10-4 by 90 degrees.

When the conductor 300 is laid only in a back and forth bending manner when being projected on the tower wall 100, the alternate change of cold and hot appears only on two opposing semi-arc surfaces of the conductor 300. When the distance from the conductor 300 to the inner surface of the tower wall 100 is arranged to be changed periodically (equivalent to the periodical adjustment of the radial distance), the alternate change of cold and hot will appear on another two opposing semi-arc surfaces of the conductor 300, therefore any semi-arc surface of the conductor 300 and its opposite semi-arc surface will have a temperature transition therebetween, which prevents an excessive temperature difference, thereby achieving the purpose of protecting the conductor 300. Reference may be made to FIG. 10-6, FIG. 10-6 is a schematic view in which the growths of the boundary layer in FIG. 10-4 and FIG. 10-5 are superposed. As illustrated, the corresponding boundary layers of the northern semi-arc surface DAC and the southern semi-arc surface DCB will overlap partially, which forms a boundary layer overlapping region 300a', and the boundary layer overlapping region 300a' functions as a temperature transition region of the two semi-arc surfaces. FIG. 10-6 only shows that the arc ADC overlaps the arc DAB, and in fact, in FIG. 10-6, a boundary layer overlapping region 300a' may be presented at each of northeast, northwest, southwest and southeast.

It is to be noted that the periodic changes of the conductor 300 in two directions are not required to be consistent, that is, one bending unit in the circumferential direction of the tower wall 100 does not necessarily correspond to the bending unit in the radial direction.

Further improvements may be made to the above embodiments. It should be known that the heat inside the tower are not only coming from the heat generated in operation of the heat source component itself, but are mostly caused by the influence of external temperature, especially the influence of the high temperature in summer, which is also an important reason for causing overheating inside the tower.

In order to reduce the overheating effect from the source, the side wall of the sunny side (opposite to the shady side, i.e., the side exposed to solar radiation) of the tower may be provided with a thermal insulation layer, and/or the shady side of the tower may be provided with a thermal conduction layer. By providing the thermal insulation layer on the sunny side, the heat can be prevented from being transferred into the tower, and by providing the thermal conduction layer on the shady side, it can facilitate the convection heat exchange between the hot air flow inside the tower and the cold air outside the shady side of the tower, thereby improving the cooling effect. In the case that the thermal insulation layer and the thermal conduction layer are both provided, a two-pronged cooling and anti-overheating effect is achieved.

Specifically, the thermal insulation layer may include an inner surface thermal insulation layer 100b and an outer surface thermal insulation layer 100a on the sunny side. The outer surface thermal insulation layer 100a may be configured to have at least one of the characteristics of a low infrared absorptivity, a high reflectivity (with high reflectivity, the absorption of heat is reduced correspondingly), and a high infrared emissivity. The inner surface thermal insulation layer 100b may be configured to have at least one of the characteristics of a low infrared emissivity, a low infrared absorptivity and a low coefficient of thermal conductivity, to prevent the inner surface thermal insulation layer 100b from transmitting heat rays to the internal space of the tower. Obviously, enabling the thermal insulation layer to have all the above characteristics is the best solution, however, the arrangement may be made according to practical heat dissipation requirement and costs.

The inner surface thermal insulation layer 100b may be made by the following solutions.

Solution 1: applying a coating having a low infrared emissivity on the inner surface.

Solution 2: adhering one layer of aluminum foil. 102 having a low emissivity on the inner surface, to prevent the surface from emitting hot rays, and providing a thermal insulation board 101 between the aluminum foil 102 and the tower wall 100, as shown in FIG. 6-3.

Solution 3: using a novel nano-intelligent heat insulation coating on the inner surface, in which the thermal insulation composition of the coating is Hydro-NM-Oxide having an ultra-low coefficient of thermal conductivity.

Solution 4: adhering a thermal insulation and refractory material on the inner surface.

Each of the thermal insulation board 101 in the solution 2 and the thermal insulation and refractory material in solution 4 may employ the materials as shown in the following table:

TABLE 1 thermal diffusivity of several thermal insulation and light materials

| | material name | | | | | |
|---|---|---|---|---|---|---|
| | steel 0.5% C | rock wool board | cement perlite product | perlite powder | glass wool | polystyrene plastic |
| thermal diffusivity $\alpha \times 10^7$ (m$^2$/s) | 148.26 | 3.82 | 2.48 | 2.31 | 7.73 | 0.71-1.1 |

TABLE 2 thermal conductivity of several thermal insulation and refractory materials

| material name | superfine glass wool felt | cement perlite product | microporous calcium silicate | slag wool |
|---|---|---|---|---|
| thermal conductivity $\lambda$ (w/m · k) | 0.033 | 0.0651 | 0.044 | 0.0674 |

Further referring to FIG. 11-1, FIG. 11-1 is a partial sectional view of a side wall at the sunny side of the wind turbine tower according to the present application, and a radiation equivalent thermal resistance of a micro unit of the tower wall 100 at the sunny side of the tower is shown at a lower part of FIG. 11-1, $A_1$ indicates an area of the coating on the outer surface of the tower; $T_1$ indicates a temperature of the coating on the outer surface of the tower; $\varepsilon_1$ indicates an emissivity of the coating on the outer surface of the tower; $\rho_1$ indicates a reflectivity of the coating on the outer surface of the tower; $\alpha_1$ indicates an absorptivity of the coating on the outer surface of the tower, $q_1$ indicates the radiation hot flow of the coating on the inner surface of the tower; $A_4$ indicates an area of the coating on the inner surface of the tower; $T_4$ indicates a temperature of the coating on the inner surface of the tower; $\varepsilon_4$ indicates an emissivity of the coating on the inner surface of the tower; $\rho_4$ indicates a reflectivity of the coating on the inner surface of the tower; and $\alpha_4$ indicates an absorptivity of the coating on the inner surface of the tower.

FIG. 11-1 is corresponding to take a "micro unit" on the sunny side of the tower wall 100, and the radially opposite sides of the "micro unit" are respectively the outer surface thermal insulation layer 100a of the tower and the inner surface thermal insulation layer 100b of the tower. A lower part of FIG. 11-1 shows the radiation equivalent thermal resistance of the micro unit. Reducing the infrared emissivity of the inner surface thermal insulation layer at the sunny side of the tower is just increasing the thermal resistance of the radiation surface, which can be achieved by using materials having a low infrared emissivity, for example, when the emissivity is reduced from 0.8 to 0.1, the surface resistance is increased to 36 times of the original surface resistance, which greatly reduces the effective radiation intensity of the coating surface.

Further referring to FIG. 11-2 and FIG. 11-3, FIG. 11-2 is a schematic view of radiant heat exchange between the conductor 300 inside the wind turbine tower and the side wall at the shady side of the wind turbine tower according to the present application, and a lower part of FIG. 11-2 shows a radiation equivalent thermal resistance of the micro unit of the tower wall 100 at the shady side of the tower; and FIG. 11-3 is a schematic perspective view showing the transfer of heat flow in FIG. 11-2. Herein, $q_{1,3}$ indicates a rate of radiant heat exchange between the power transmission cable and the tower; $q_{rN}$ indicates the radiant heat flow on the outer surface of the shady side of the tower; $q_{conv}$ indicates a rate of convection heat exchange between the outer surface of the shady side of the tower and air; and $q_{rising\ air\ flow}$ indicates the heat flux acquired by the air around the power transmission cable.

The thermal conduction layer on the shady side may include an inner surface thermal conduction layer 103 and an outer surface thermal conduction layer on the shady side. The outer surface thermal conduction layer may be configured to have at least one of the characteristics of a high reflectivity and a low infrared absorptivity; and the inner surface thermal conduction layer 103 is configured to have at least one of the characteristics of a low reflectivity, a high infrared absorptivity and a high infrared emissivity. The specific selection may be made in consistent with the thermal insulation layer, and may be made according to the heat dissipation requirements and the costs.

In order to further facilitate the heat dissipation of the power transmission conductor 300, a coating having a high infrared emissivity may be applied on the surface of the conductor 300 to cooperate with the inner surface thermal conduction layer having a low reflectivity, a high infrared absorptivity and a high infrared emissivity on the shady side of the tower wall 100, to accelerate the heat dissipation of the conductor 300.

Figure 12:
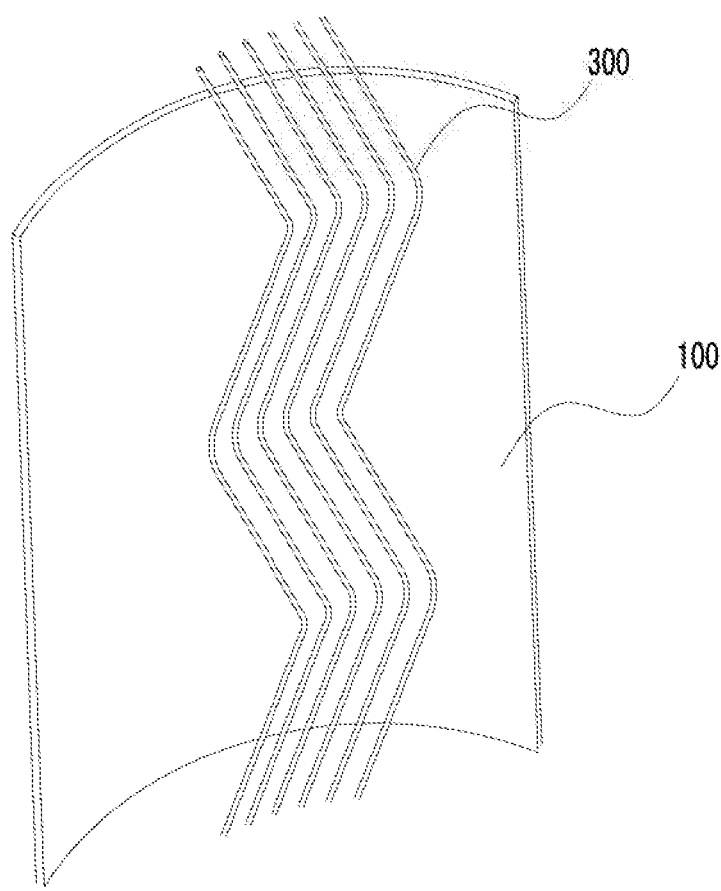
FIG. 12 is a schematic view showing the structure of the conductors arranged in one row according to the present application.

The conductors 300 are arranged in two rows in FIG. 10-1, and may also be arranged in one row as shown in FIG. 12. FIG. 12 is a schematic view showing the structure of the conductors arranged in one row according to the present application. Actually, FIG. 6-3 and FIG. 7-3 are also schematically shown with this arrangement.

In order to further improve the heat dissipation requirement, the spacing between the conductors 300 in each group of the conductors 300 may be appropriately increased or the conductors 300 in each group of the conductors 300 may be staggered, to reduce the spatial radiant thermal resistance between the conductors 300, which is equivalent to increase the radiant heat flow rate released by the conductors 300 to the thermal conduction layer on the inner surface at the shady side, and thus improving the heat dissipation effect.

Finally, referring again to FIG. 3, the high temperature region at the sunny side actually appears at a location at 60 degrees westward from the due south, and the radiation intensity only begins to reduce until, reaching the due west, and thus, the most obvious high temperature region can be determined according to the actual thermal radiation data. In this solution, in view of that the position for laying the above conductor 300 on the shady side can be accurately determined, and the conductor 300 is arranged to be twisted, thus the heat dissipation of the conductor 300 is improved greatly. Correspondingly, the heat dissipation performance of other heat source members inside the tower is also improved, therefore, in this case, it is only required to provide a thermal insulation layer at the high temperature position of the tower wall 100, without requiring to provide a thermal insulation layer on the whole south half side of the tower wall 100, thus saving the costs. In each of FIG. 6-3 and FIG. 7-3, the thermal insulation layer is arranged at a position from due south to due west, that is, the thermal insulation layer is applied in a 90 degree range. It may be appreciated that, the laying range may be slightly larger or smaller, which can be determined according to practical working condition.

The arrangement range of the thermal conduction layer on the shady side may be set comprehensively in accordance with factors such as the laying position of the conductors 300, the distribution of the surrounding cold air and the direction of the storm. In each of FIG. 6-3 and FIG. 7-3, the thermal conduction layer on the shady side is arranged in a range from 30 degrees westward from the due north to about 45 degrees eastward from the due north.

The above described embodiments are only preferred embodiments of the present application, and it should be noted that for the person skilled in the art, several improvements and modifications can be made without departing from the principle of the present application, and these improvements and modifications should also be deemed to fall into the scope of protection of the present application.

The invention claimed is:

1. A method for laying a power transmission conductor, the power transmission conductor being laid in an enclosure, comprising steps of:
    acquiring changing situations of a surface heat transfer coefficient of an outer surface, in contact with a windward side incoming flow, of a shady side of the enclosure according to airflow parameters outside the enclosure;
    determining a target laying position according to an inside position, corresponding to a highest surface heat transfer coefficient, of the shady side; and
    laying the power transmission conductor at the target laying position.

2. The method for laying the power transmission conductor according to claim 1, wherein the step of acquiring changing situations of the surface heat transfer coefficient comprises: acquiring corresponding Reynolds numbers according to airflow parameters outside the enclosure, and establishing changing situations of the surface heat transfer coefficient of the outer surface at the shady side at different Reynolds numbers; and the step of determining the target laying position comprises: determining the target laying position according to inside positions, corresponding to the highest surface heat transfer coefficient at different Reynolds numbers, of the shady side.

3. The method for laying the power transmission conductor according to claim 2, comprising: recording positions, corresponding to the highest surface heat transfer coefficient at different Reynolds numbers, at the shady side as target laying angles, wherein, the target laying angle is defined as an included angle formed between a normal vector of a contact surface, where the windward side incoming flow comes into contact with an outer wall of the enclosure, and the position corresponding to the highest surface heat transfer coefficient on the enclosure; and the target laying position is between a minimum target laying angle and a maximum target laying angle at different Reynolds numbers.

4. The method for laying the power transmission conductor according to claim 2, wherein the changing situations of the surface heat transfer coefficient of the outer surface, in contact with the windward side incoming flow, of the shady side of the enclosure is reflected by a Nusselt number.

5. The method for laying the power transmission conductor according to claim 1, wherein the shady side is defined as a range from 45 degrees clockwise from due north direction to 45 degrees counterclockwise from the due north direction.

6. The method for laying the power transmission conductor according to claim 1, wherein the step of acquiring changing situations of the surface heat transfer coefficient comprises: according to a Reynolds number corresponding to a height position of the enclosure, acquiring changing situations of the surface heat transfer coefficient of a circumferential position of the outer surface at the shady side corresponding to the height position;

the inside position is an inside position corresponding to the highest surface heat transfer coefficient of the circumferential position; and the step of determining the target laying position comprises: taking a vertically extending line corresponding to the inside position as a reference laying line for laying the power transmission conductor; and rotating the reference laying line clockwise or counterclockwise by a predetermined angle according to changes of the Reynolds numbers at different heights of the enclosure, and determining a position of the rotated reference laying line as the target laying position.

7. The method for laying the power transmission conductor according to claim 1, wherein the step of acquiring changing situations of the surface heat transfer coefficient comprises: selecting one height position at an upper segment of the enclosure and one height position at a lower segment of the enclosure, and according to Reynolds numbers at the two height positions, acquiring changing situations of the surface heat transfer coefficient of circumferential positions of the outer surface at the shady side corresponding to the two height positions;

the inside position comprises inside positions corresponding to the highest surface heat transfer coefficients of the circumferential positions corresponding to the two height positions; and the step of determining the target laying position comprises: taking a connection line connecting the two inside positions corresponding to the highest surface heat transfer coefficients of the two circumferential positions as the target laying position.

8. The method for laying the power transmission conductor according to claim 1, wherein the step of acquiring changing situations of the surface heat transfer coefficient comprises: selecting one height position at an upper segment of the enclosure and one height position at a lower segment of the enclosure, and according to Reynolds numbers at the two height positions, acquiring changing situations of the surface heat transfer coefficient of circumferential positions of the outer surface at the shady side corresponding to the two height positions;

the inside position comprises inside positions corresponding to the highest surface heat transfer coefficients of the circumferential positions corresponding to the two height positions; and the step of determining the target laying position comprises: taking a connection line connecting the two inside positions corresponding to the highest surface heat transfer coefficients of the two circumferential positions as a reference laying line; and rotating the reference laying line by a predetermined angle according to changes of the highest surface heat transfer coefficients of the two circumferential positions, and determining a position of the rotated reference laying line as the target laying position.

9. The method for laying the power transmission conductor according to claim 1, wherein the windward side incoming flow is an incoming flow in a main wind direction obtained according to a weather wind rose of a location where the enclosure is located.

10. The method for laying the power transmission conductor according to claim 9, wherein the weather wind rose is selected as a weather wind rose of a high temperature season of the location where the enclosure is located.

11. The method for laying the power transmission conductor according to claim 1, wherein the power transmission conductor is bent to allow the power transmission conductor to be bent back and forth when being projected onto an inner surface of the enclosure.

12. The method for laying the power transmission conductor according to claim 11, wherein the electric power transmission conductor is further bent to allow a vertical distance from the power transmission conductor to the inner surface of the enclosure to change alternately.

13. An enclosure having a power transmission conductor laid in an oriented manner, the power transmission conductor being arranged inside the enclosure, wherein the power transmission conductor is laid inside the enclosure with the method according to claim 1.

14. The enclosure according to claim 13, wherein an included angle between the target laying position of the power transmission conductor and the windward side incoming flow ranges from 110 degrees to 125 degrees.

15. The enclosure according to claim 14, wherein the windward side incoming flow comes from a southwest direction or a southeast direction.

16. The enclosure according to claim 13, wherein the power transmission conductor is laid in a back and forth bending manner when being projected on an inner surface of the enclosure.

17. The enclosure according to claim 16, wherein a vertical distance from the power transmission conductor to the inner surface of the enclosure changes alternately.

18. The enclosure according to claim 16, wherein the structure of a unit formed by laying the conductor in the back and forth bending manner is polyline shaped, or trapezoidal, or S-shaped; and the polyline shape is bent directly or has an arc shape at a bent position.

19. The enclosure according to claim 13, wherein in a circumferential direction of the inner surface of the enclosure, the power transmission conductor as a whole has a radian adapted to the arc-shaped inner surface of the enclosure.

20. The enclosure according to claim 13, wherein an extending direction of the power transmission conductor from top to bottom is arranged to be inclined with respect to a vertical direction, and is adapted to an inclination angle of the inner surface of the enclosure.

21. The enclosure according to claim 13, wherein a sunny side of the enclosure is provided with a thermal insulation layer, and/or a shady side of the enclosure is provided with a thermal conduction layer.

22. The enclosure according to claim 21, wherein the thermal insulation layer comprises an inner surface thermal insulation layer and an outer surface thermal insulation layer of the sunny side, the outer surface thermal insulation layer is configured to have at least one of characteristics of a low infrared absorptivity, a high reflectivity, and a high infrared emissivity; and the inner surface thermal insulation layer is configured to have at least one of characteristics of a low infrared emissivity, a low infrared absorptivity and a low thermal conduction coefficient; and the thermal conduction layer comprises an inner surface thermal conduction layer and an outer surface thermal conduction layer of the shady side, the outer surface thermal conduction layer is configured to have at least one of characteristics of a high reflectivity and a low infrared absorptivity; and the inner surface thermal conduction layer is configured to have at least one of characteristics of a low reflectivity, a high infrared absorptivity and a high infrared emissivity.

23. The enclosure according to claim 21, wherein the thermal insulation layer is arranged in a high temperature region at the sunny side, and the high temperature region is determined according to thermal radiation data monitored in summer and is defined as a range from 90 degrees to 100 degrees westward from the due south.

24. The enclosure according to claim 13, wherein an outer surface of the power transmission conductor is coated with a coating having a high infrared emissivity; and/or, the enclosure is a wind turbine tower.

25. An enclosure having a power transmission conductor laid in an oriented manner, the power transmission conductor being arranged inside the enclosure, wherein the power transmission conductor is laid at a shady side of the enclosure; and a target laying position of the power transmission conductor at the shady side is determined by an inside position, corresponding to a highest surface heat transfer coefficient, at the shady side; and the surface heat transfer coefficient is a surface heat transfer coefficient of an outer surface, in contact with a windward side incoming flow, of the shady side.

26. The enclosure having the power transmission conductor laid in the oriented manner according to claim 25, wherein the target laying position is inclined with respect to a vertically extending line on the inner side of the shady side, and an angle of inclination is determined by changing situations of Reynolds numbers corresponding to the windward side incoming flow at different heights of the shady side.

27. The enclosure according to claim 25, wherein an included angle between the target laying position of the power transmission conductor and the windward side incoming flow ranges from 110 degrees to 125 degrees.

28. The enclosure having the power transmission conductor laid in the oriented manner according to claim 25, wherein the windward side incoming flow is an incoming flow in a main wind direction obtained according to a weather wind rose of a location where the enclosure is located.

* * * * *